US009985883B2

(12) United States Patent
MeLampy et al.

(10) Patent No.: US 9,985,883 B2
(45) Date of Patent: May 29, 2018

(54) NAME-BASED ROUTING SYSTEM AND METHOD

(71) Applicant: 128 Technology, Inc., Burlington, MA (US)

(72) Inventors: Patrick J. MeLampy, Dunstable, MA (US); Michael Baj, Somerville, MA (US); Prashant Kumar, Andover, MA (US); Robert Penfield, Concord, MA (US); Patrick Timmons, Newton, MA (US)

(73) Assignee: 128 Technology, Inc., Burlington, MA (US)

( * ) Notice: Subject to any disclaimer, the term of this patent is extended or adjusted under 35 U.S.C. 154(b) by 161 days.

(21) Appl. No.: 15/054,781

(22) Filed: Feb. 26, 2016

(65) Prior Publication Data

US 2017/0250906 A1 Aug. 31, 2017

(51) Int. Cl.
*H04L 12/741* (2013.01)
*H04L 12/721* (2013.01)
*H04L 29/06* (2006.01)
*H04L 12/749* (2013.01)
*H04L 29/12* (2006.01)

(52) U.S. Cl.
CPC .......... *H04L 45/74* (2013.01); *H04L 45/566* (2013.01); *H04L 45/72* (2013.01); *H04L 45/741* (2013.01); *H04L 61/00* (2013.01); *H04L 65/1069* (2013.01)

(58) Field of Classification Search
CPC .................................................. H04L 65/1069
See application file for complete search history.

(56) References Cited

U.S. PATENT DOCUMENTS

| 6,515,963 | B1 | 2/2003 | Bechtolsheim et al. |
| 6,563,824 | B1 | 5/2003 | Bhatia et al. |
| 6,584,071 | B1 | 6/2003 | Kodialam et al. |
| 6,721,334 | B1 | 4/2004 | Ketcham |

(Continued)

FOREIGN PATENT DOCUMENTS

| CN | 101552703 A | 10/2009 |
| CN | 101646220 A | 2/2010 |

(Continued)

OTHER PUBLICATIONS

Berners-Lee et al., *Uniform Resource Identifier (URI): Generic Syntax*, Network Working Group, Request for Comments 3986, The Internet Society, 61 pages, Jan. 2005.

(Continued)

*Primary Examiner* — Sulaiman Nooristany
(74) *Attorney, Agent, or Firm* — Sunstein Kann Murphy & Timbers LLP

(57) ABSTRACT

An advanced routing system and protocol (referred to herein as "Route Exchange" or "REX") hides familiar IPv4 and IPv6 addresses and replaces traditional routing logic with words and relationships between named elements. Among other things, this makes IP routing tables significantly easier to understand. In addition, a single routing scheme can be used for any combination of private networks, public networks, IPv4 addressing models, and IPv6 addressing models. Underneath the words lie real IP addresses that move the packets from place to place. These routing addresses abstract away the underlying network.

21 Claims, 13 Drawing Sheets

(56) References Cited

U.S. PATENT DOCUMENTS

| | | |
|---|---|---|
| 6,738,387 B1 | 5/2004 | Lin et al. |
| 6,778,531 B1 | 8/2004 | Kodialam et al. |
| 6,798,743 B1 | 9/2004 | Ma et al. |
| 7,020,143 B2 | 3/2006 | Zdan |
| 7,035,214 B1 | 4/2006 | Seddigh et al. |
| 7,106,739 B2 | 9/2006 | Beier |
| 7,154,902 B1 | 12/2006 | Sikdar |
| 7,218,632 B1 | 5/2007 | Bechtolsheim et al. |
| 7,315,541 B1 | 1/2008 | Housel et al. |
| 7,373,660 B1 | 5/2008 | Guichard et al. |
| 7,466,703 B1 | 12/2008 | Arunachalam et al. |
| 7,536,720 B2 | 5/2009 | Burdett et al. |
| 7,634,805 B2 | 12/2009 | Aroya |
| 7,706,411 B2 | 4/2010 | Wakumoto et al. |
| 7,730,301 B2 | 6/2010 | Correll et al. |
| 7,773,611 B2 | 8/2010 | Booth, III et al. |
| 7,872,973 B2 | 1/2011 | Sterne et al. |
| 8,068,417 B1 | 11/2011 | Roberts |
| 8,094,560 B2 | 1/2012 | Bagepalli et al. |
| 8,139,479 B1 | 3/2012 | Raszuk |
| RE44,119 E | 4/2013 | Wang et al. |
| 8,437,248 B2 | 5/2013 | Li et al. |
| 8,527,641 B2 | 9/2013 | Degaonkar et al. |
| 8,570,893 B2 | 10/2013 | Guo et al. |
| 8,584,199 B1 | 11/2013 | Chen et al. |
| 8,634,428 B2 | 1/2014 | Le Pennec et al. |
| 8,804,489 B2 | 8/2014 | Lu et al. |
| 8,942,085 B1 | 1/2015 | Pani et al. |
| 8,989,020 B2 | 3/2015 | So |
| 9,059,920 B2 | 6/2015 | Ravindran et al. |
| 9,160,652 B2 | 10/2015 | Taillon et al. |
| 9,240,953 B2 | 1/2016 | Carlstrom |
| 9,276,864 B1 | 3/2016 | Vincent |
| 2001/0030649 A1 | 10/2001 | Mamiya et al. |
| 2002/0044553 A1 | 4/2002 | Chakravorty |
| 2002/0075883 A1 | 6/2002 | Dell et al. |
| 2002/0150041 A1 | 10/2002 | Reinshmidt et al. |
| 2002/0176363 A1 | 11/2002 | Durinovic-Johri et al. |
| 2003/0198189 A1 | 10/2003 | Roberts et al. |
| 2003/0214938 A1 | 11/2003 | Jindal et al. |
| 2004/0014467 A1 | 1/2004 | O'Neill et al. |
| 2004/0088542 A1 | 5/2004 | Daude et al. |
| 2004/0264481 A1 | 12/2004 | Darling et al. |
| 2005/0036616 A1 | 2/2005 | Huang et al. |
| 2005/0063307 A1 | 3/2005 | Samuels et al. |
| 2005/0182932 A1 | 8/2005 | Wheeler |
| 2005/0238022 A1 | 10/2005 | Panigrahy |
| 2006/0045014 A1 | 3/2006 | Charzinski |
| 2006/0176894 A1 | 8/2006 | Oh et al. |
| 2007/0171825 A1 | 7/2007 | Roberts et al. |
| 2007/0171826 A1 | 7/2007 | Roberts et al. |
| 2008/0214175 A1 | 9/2008 | Papadoglou et al. |
| 2009/0007021 A1 | 1/2009 | Hayton |
| 2009/0059958 A1 | 3/2009 | Nakata |
| 2010/0125898 A1 | 5/2010 | Dubuc et al. |
| 2010/0191968 A1 | 7/2010 | Patil et al. |
| 2012/0144061 A1 | 6/2012 | Song |
| 2012/0236860 A1 | 9/2012 | Kompella et al. |
| 2013/0227166 A1 | 8/2013 | Ravindran et al. |
| 2013/0297824 A1 | 11/2013 | Lan et al. |
| 2014/0040488 A1 | 2/2014 | Small et al. |
| 2014/0177639 A1* | 6/2014 | Vershkov ............... H04L 45/58 370/401 |
| 2014/0344459 A1* | 11/2014 | Kludy .................... H04L 47/70 709/226 |
| 2015/0139238 A1* | 5/2015 | Pourzandi ............. H04L 45/42 370/392 |
| 2015/0188814 A1 | 7/2015 | Jain et al. |
| 2015/0229618 A1 | 8/2015 | Wan et al. |
| 2015/0381324 A1 | 12/2015 | Mirsky et al. |
| 2016/0094444 A1 | 3/2016 | MeLampy et al. |
| 2016/0105393 A1* | 4/2016 | Thakkar ............... H04L 41/0823 709/220 |
| 2016/0226760 A1* | 8/2016 | Liljenstolpe ........... H04L 45/74 |
| 2017/0187629 A1* | 6/2017 | Shalev ................. H04L 43/0823 |

FOREIGN PATENT DOCUMENTS

| | | |
|---|---|---|
| CN | 101068242 B | 4/2010 |
| CN | 102158371 A | 8/2011 |
| CN | 101640629 B | 8/2012 |
| CN | 102739507 A | 10/2012 |
| CN | 101207604 B | 3/2013 |
| CN | 102769679 B | 6/2015 |
| CN | 103179192 B | 11/2015 |
| CN | 105245469 A | 1/2016 |
| EP | 1 313 267 B1 | 12/2006 |
| EP | 2 541 848 A1 | 1/2013 |
| KR | 10-2011-0062994 A | 6/2011 |
| WO | WO 2007/084707 A2 | 7/2007 |
| WO | WO 2007/084755 A2 | 7/2007 |
| WO | WO 2008/043230 A1 | 4/2008 |
| WO | WO 2015/131537 A1 | 9/2015 |

OTHER PUBLICATIONS

Bjorklund, *YANG—A Data Modeling Language for the Network Configuration Protocol (NETCONF)*, Internet Engineering Task Force (IETF), Request for Comments 6020, ISSN: 2070-1721, 173 pages, Oct. 2010.
CAIDA, *Observing routing asymmetry in Internet traffic*, (www.caida.org/research/traffic-analysis/asymmetry/1), 7 pages, dated Jul. 17, 2013.
Chiosi, et al, *Network Functions Virtualisation—Introductory White Paper*, Issue 1, at the "SDN and OpenFlow World Congress", Darmstadt-Germany, (http://portal.etsi.org/nfv/nfv_white_paper), 16 pages, dated Oct. 22, 2012.
Cisco Systems, *Parallel Express Forwarding on the Cisco 10000 Series*, (White Paper) Cisco Systems, 4 pages, printed Jun. 17, 2015.
Data Plane Development Kit, *Programmer's Guide*, Release 16.04.0, 216 pages, Apr. 12, 2016.
Davis, *Layer 3 Switches Explained*, Happy Router, 6 pages, dated Aug. 30, 2007.
Filsfils, et al., *Segment Routing Architecture*, Network Working Group, Draft, 28 pages, Oct. 21, 2013.
Hansson, et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.
Herbert, *xps: Transmit Packet Steering*, Eklektix, Inc., 11 pages, Oct. 26, 2010.
IANA, *Transmission Control Protocol (TCP) Parameters*, (www.iana.org/assignments/tcp-parameters/tcp-parameters.xhtm), 5 pages, dated Sep. 22, 2014.
Katz et al., *Bidirectional Forwarding Detection (BFD)*, Internet Engineering Task Force (IETF), Request for Comments 5880, ISSN: 2070-1721, Juniper Networks, 49 pages, Jun. 2010.
Klement, *1.2 Overview of a TCP communications session*, RPG IV Socket Tutorial (http://www.scottklement.com/rpg/socketut/overview), 2 pages, 2001.
Microsoft, *Introduction to Receive Side Scaling*, Developer Resources, https://msdn.microsoft.com/en-us/library/windows/hardware/ff556942(v=vs.85).aspx, 3 pages, Apr. 2014.
Microsoft, *RSS with a Single Hardware Receive Queue*, Developer Resources, https://msdn.microsoft.com/en-us/library/windows/hardware/ff570727(v=vs.85).aspx, 2 pages, Jan. 2015.
Microsoft, *RSS with Hardware Quelling*, Developer Resources, https://msdn.microsoft.com/en-us/library/windows/hardware/ff570728(v=vs.85).aspx, 2 pages, Jan. 2015.
Microsoft, *Non-RSS Receive Processing*, Developer Resources, https://msdn.microsoft.com/en-us/library/windows/hardware/ff568798(v=vs.85).aspx, 2 pages, Jan. 2015.
PC Magazine Encyclopedia, *Definition of: TCP/IP abc's*, PC Magazine Encyclopedia (www.pcmag.com/encyclopedia/term/52615), 5 pages, 2005.
Previdi, et al., *IPv6 Segment Routing Header (SRH)*, Network Working Group, Draft, 24 pages, Jul. 3, 2014.

(56) References Cited

OTHER PUBLICATIONS

Roberts, *The Next Generation of IP—Flow Routing*, SSGRR 2003S International Conference, L'Aquila, Italy, 11 pages, Jul. 29, 2003.
Rouse, *What is routing table?* Posted by Margaret Rouse (http://searchnetworking.techtarget.com/definition/routing-table), 5 pages, Apr. 2007.
Shang et al., *Making Better Use of All Those TCP ACK Packets*, Computer Science Department, Worcester Polytechnic Institute, 10 pages, 2005.
Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.
Sollins, et al., *Functional Requirements for Uniform Resource Names*, Network Working Group, Request for Comments 1737, 7 pages, Dec. 1994.
Srinivasan, et al., *A Technique for Low Energy Mapping and Routing in Network-on-Chip Architectures*, ISLPED '05 Proceedings of the 2005 International Symposium on Low Power Electronics and Design, 6 pages, Aug. 8-10, 2005.
Wikipedia, *LAN switching*, 5 pages, dated Jun. 12, 2013.
Wikipedia, *Management information base*, 6 pages, dated Jul. 15, 2013.
Wikipedia, *Reverse path forwarding*, 3 pages, dated Jul. 31, 2013.
Wikipedia, *Equal-cost multi path routing*, 1 page, dated Sep. 12, 2013.
Wikipedia, *Transmission Control Protocol*, 18 pages, dated Sep. 16, 2013.
Wikipedia, *Software-defined networking*, 6 pages, dated Sep. 16, 2013.
Wikipedia, *Network socket*, 4 pages, dated Sep. 19, 2013.
Wikipedia, *Router (computing)*, 8 pages, dated Sep. 23, 2013.
Wikipedia, *Network address translation*, 11 pages, dated Sep. 24, 2013.
Wikipedia, *Open vSwitch*, 2 pages, dated Nov. 24, 2013.
Wikipedia, *Active queue management* https://en.wikipedia.org/wiki/Active_queue_management, 2 pages, Apr. 22, 2015.
Wikipedia, *Network interface controller*, https://en.wikipedia.org/wiki/Network_interface_controller, 5 pages, May 19, 2015.
International Searching Authority, International Search Report—International Application No. PCT/2015/044815, dated Dec. 6, 2015, together with the Written Opinion of the International Searching Authority, 8 pages.
International Searching Authority, International Search Report—International Application No. PCT/US2015/060840, dated Mar. 8, 2016, together with the Written Opinion of the International Searching Authority, 13 pages.
International Searching Authority, International Search Report—Application No. PCT/US2016/013416, dated Jun. 8, 2016, together with the Written Opinion of the International Searching Authority, 12 pages.
International Searching Authority, International Search Report—Application No. PCT/US2016/026938, dated Jul. 28, 2016, together with the Written Opinion of the International Searching Authority, 9 pages.
International Searching Authority, International Search Report—Application No. PCT/US2017/016984, dated May 18, 2017, together with the Written Opinion of the International Searching Authority, 10 pages.

* cited by examiner

NAME-BASED ROUTING SYSTEM AND METHOD

CROSS-REFERENCE TO RELATED APPLICATION(S)

This patent application is related to U.S. patent application Ser. No. 14/497,954 filed Sep. 26, 2014, entitled, "NETWORK PACKET FLOW CONTROLLER," and naming MeLampy, Baj, Kaplan, Kumar, Penfield, and Timmons as inventors, the disclosure of which is incorporated herein, in its entirety, by reference.

This patent application also is related to U.S. patent application Ser. No. 14/562,917, filed Dec. 8, 2014, entitled, "STATEFUL LOAD BALANCING IN A STATELESS NETWORK," and naming Timmons, Baj, Kaplan, MeLampy, Kumar, and Penfield as inventors, the disclosure of which is incorporated herein, in its entirety, by reference.

This patent application also is related to U.S. patent application Ser. No. 14/715,036, filed May 18, 2015, entitled, "NETWORK DEVICE AND METHOD FOR PROCESSING A SESSION USING A PACKET SIGNATURE," and naming Kumar, Timmons, and MeLampy as inventors, the disclosure of which is incorporated herein, in its entirety, by reference.

This patent application also is related to U.S. patent application Ser. No. 14/833,571, filed Aug. 24, 2015, entitled, "NETWORK PACKET FLOW CONTROLLER WITH EXTENDED SESSION MANAGEMENT," and naming Kaplan, Kumar, Timmons, and MeLampy as inventors, the disclosure of which is incorporated herein, in its entirety, by reference.

FIELD OF THE INVENTION

The present invention relates to data routing and, more particularly, to routing packets based on words and relationships between named elements.

BACKGROUND OF THE INVENTION

The Internet Protocol ("IP") serves as the de-facto standard for forwarding data messages ("datagrams") between network devices connected with the Internet. To that end, IP delivers datagrams across a series of Internet devices, such as routers and switches, in the form of one or more data packets. Each packet has two principal parts: (1) a payload with the information being conveyed (e.g., text, graphic, audio, or video data), and (2) a header, known as an "IP header," having the address of the network device to receive the packet(s) (the "destination device"), the identity of the network device that sent the packet (the "originating device"), and other data for routing the packet.

Many people thus analogize packets to a traditional letter using first class mail, where the letter functions as the payload, and the envelope, with its return and mailing addresses, functions as the IP header.

Current Internet devices forward packets one-by-one based essentially on the address of the destination device in the packet header in accordance with an Internet routing protocol such as BGP, OSPFv2, IS-IS, etc. Among other benefits, this routing scheme enables network devices to forward different packets of a single datagram along different routes to reduce network congestion, or avoid malfunctioning network devices. Those skilled in the art thus refer to IP as a "stateless" protocol because, among other reasons, it does not save packet path data, and does not pre-arrange transmission of packets between end points.

Current Internet routing protocols generally cannot route packets from an element in one private network to an element in another private network because the IP address spaces used for elements in those private networks often overlap. These are often referred to as "unroutable" addresses, which are not useful on the public Internet.

Therefore, Network Address Translation (NAT) is often used to convert between local addresses used for routing within the private networks and public Internet addresses used for routing over the public Internet. The public Internet address is used to route packets between the private networks. Within each private network, other information in the packet is used to determine the local address used to route the packet to the destination entity within the destination private network.

Over the past decade, network challenges have evolved from bandwidth and broadband availability to security and mobility. Cloud has emerged as a primary service delivery architecture that achieves economies of scale unheard of in the past. Cloud embraces sharing of resources, including computing and storage. This has created a huge number of new requirements unmet by today's IP routing models, such as:

Private-network to private-networking models
Dynamically-arranged, service-specific Quality of Service
Unified IPv4 and IPv6 routing tables
Authenticated directional routing
On-the-fly encryption
Overlapping address support
Load balancing instead of equal-cost multipath (ECMP)
Integrated DPI and resulting flow analytics To meet these requirements, current architectures require middleboxes (e.g., firewalls, DPI devices, load balancers) mixed with overlay networking (e.g., VLANs, nested VLANs, VxLANs, MPLS, Cisco ACI, VMware NSX, Midonet) and orchestration (e.g., OpenStack, service function chaining).

SUMMARY OF VARIOUS EMBODIMENTS

In accordance with one embodiment, a method of routing packets by a local route exchange processor in a local router involves maintaining, by the local route exchange processor, in a computer storage of the local router, at least one forwarding information base that associates a plurality of named fabrics with at least one uniquely named authority, each fabric having at least one named tenant, each tenant having at least one named service, wherein the local route exchange processor is associated with a distinct local fabric from among the plurality of named fabrics; exchanging fabric adjacency information by the local route exchange processor with at least one remote route exchange processor, each remote route exchange processor operating in a separate remote router and associated with a distinct remote fabric from among the plurality of named fabrics; performing, by local the route exchange processor, a mesh-up process to establish at least one communication path between the local fabric and each of the remote fabrics; receiving first packet to establish a communication session between a source service in a source tenant and a destination service in a destination tenant; determining the source tenant for the communication session; identifying, using the at least one forwarding information base, a service agent for the communication session based on the name of the source tenant and the name of the destination service; selecting a communication path for the communication session; and forwarding the first packet via the selected communication path.

In various alternative embodiments, all fabrics within a single authority may be automatically considered to be adjacent. The at least one forwarding information base may include a separate forwarding information base for each source tenant. The first packet may include first packet metadata including the name of the source tenant, in which case determining the source tenant for the communication session may involve determining the source tenant based on the name of the source tenant in the first packet metadata. In some cases, determining the source tenant for the communication session may involve determining the source tenant based on a source address in the packet. Identifying the service agent may involve selecting one service agent instance from among a plurality of candidate service agent instances. Forwarding the first packet may involve determining whether a next hop device is a remote router having a remote route exchange processor and inserting first packet metadata into the packet when the next hop device is a remote router having a remote route exchange processor.

In accordance with other embodiments, a router comprises a computer storage and a local route exchange processor configured to implement any of the methods of routing packets summarized above.

In accordance with still other embodiments, a computer program product comprises a tangible, non-transitory computer readable medium having embodied therein a computer program that, when run on at least one computer processor, implements a local route exchange processor for a local router, the local route exchange processor implementing any of the methods of routing packets summarized above.

Illustrative embodiments of the invention are implemented as a computer program product having a computer usable medium with computer readable program code thereon. The computer readable code may be read and utilized by a computer system in accordance with conventional processes.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Figure 1:
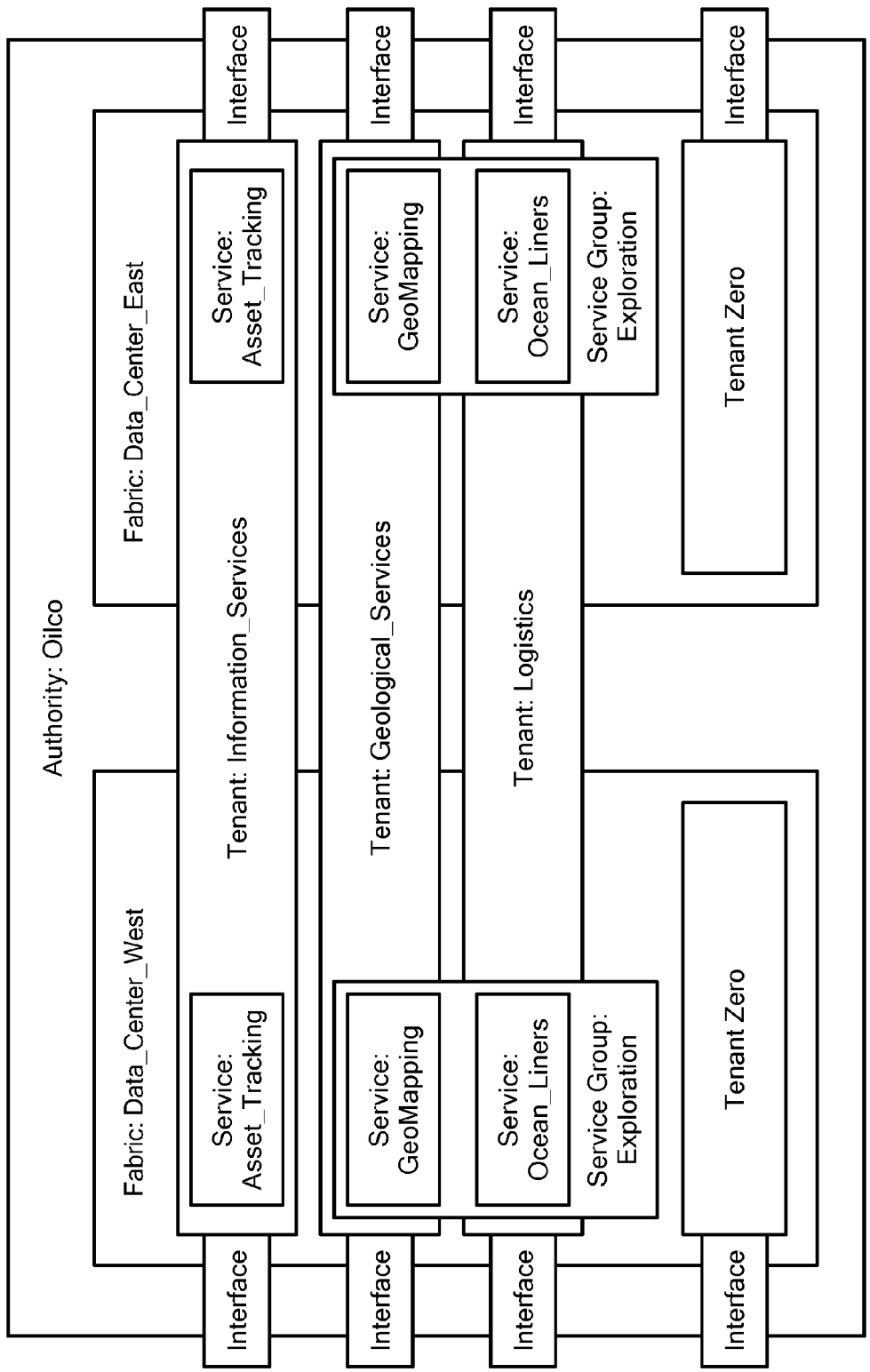
FIG. 1 is a schematic diagram showing the relationship between an Authority, Fabrics, Tenants, Services, and Service Groups of a REX routing system, in accordance with one exemplary embodiment.

In exemplary embodiments of the present invention, an advanced routing system and protocol (referred to herein as "Route Exchange" or "REX") hides familiar IPv4 and IPv6 addresses and replaces traditional routing logic with words and relationships between named elements. Among other things, this makes IP routing tables significantly easier to understand. In addition, a single routing scheme can be used for any combination of private networks, public networks, IPv4 addressing models, and IPv6 addressing models. Underneath the words lie real IP addresses that move the packets from place to place. These routing addresses abstract away the underlying network.

Exemplary embodiments of the present invention use names (referred to herein as a "Qualified Service Name" or "QSN") to create routes that do not use IP addresses to determine the route. The QSN essentially identifies a destination element within a destination private network. The QSN is passed by the source element as metadata in the first packet of a session, e.g., the first SYN packet of a TCP connection. A destination element can be associated with multiple types of service, e.g., it may service voice traffic, web browsing, etc. The destination element informs the source element of the types of services it supports and also informs the source element how to address each type of service. Different types of connections can be established for the different types of services, e.g., high-priority traffic might be carried over a direct connection between the private networks or over an existing MPLS connection, whereas low-priority traffic such as web browsing might be carried over the generic Internet. Thus, the connections are decoupled from the Internet and IP addresses because, among other things, some of the connections might not even traverse the Internet (e.g., some connections might traverse private or dedicated communication channels) or might not rely on IP addresses (e.g., some connections might use MPLS labels).

Some specific exemplary embodiments are now described with reference to the following named elements or entities:

A "Fabric" is a single routing instance within the REX schema. A fabric contains one logical CORE and one or more SLICEs. The collection of these nodes can be viewed as a single IP Router A "CORE" contains a single BGP4, OSPFv2, IS-IS, REX IP router control plane. This includes all of the databases, routing protocols and analytics for a single instance of a REX product. A "logical CORE" refers to the collection of a single active CORE and one or more redundant COREs.

A "SLICE" contains a single IP router forwarding plane. The SLICE is roughly analogous to a line card, but it can be implemented solely in software. A SLICE is not useful alone; it must be connected to and associated with a CORE within a fabric.

An "Authority" is a single managed network of routing instances (Fabrics). This describes a single network, a collection of networks, or single managed entity for a group of routers, and can be considered to be conceptually equivalent to an Autonomous System. Authorities are named with text strings, and this string is used in the REX routing protocol. Authority names are unique within the REX system and are assigned/managed by a naming authority. In exemplary embodiments, Authority names are resource names that conform to RFC 1737.

A "Tenant" is a single sub-network that is to be segregated and separated from all others, e.g., for security, manageability, and analytics. This is akin to VLAN or VxLAN or VRF. A Tenant is a text string assigned by an Authority or parent Tenant.

A "Service" is a single named application and is the target of a route. This is similar to an IP address after DNS resolution. A Service is named with a text string that normally matches the URL of a service. This text string is used in the REX Routing Protocol.

A "Service Group" is a portion of a sub-network (Tenant) that is to be segregated, e.g., for manageability and analytics. There is no comparative current world element. This is a text string that is used in the REX Routing Protocol.

A "Qualified Service Name" or "QSN" is an addressable resource. In exemplary embodiments, QSNs use URI Generic Syntax defined by RFC 3986 and are in the form:

QSN://Subtenant.Tenant.Authority/ServiceGroup/Service

Every QSN has one unique Authority. The Authority is named uniquely by a naming authority. In exemplary embodiments, a private naming authority is used, although in alternative embodiments a public naming authority (e.g., IANA or equivalent) may be used. Service Groups are optional, and should they not be used, the QSN can be shortened to not include this text.

Relationship Between the Named Entities

FIG. 1 is a schematic diagram showing the relationship between an Authority, Fabrics, Tenants, Services, and Service Groups of a REX routing system, in accordance with one exemplary embodiment. Specifically, this Authority (named "Oilco") includes two Fabrics (i.e., "Data_Center_West" and "Data_Center_East"), four Tenants (i.e., "Information_Services," "Geological_Services," "Logistics," and a global tenant "Tenant Zero"), three Services (i.e., "Asset_Tracking," "GeoMapping," and "Ocean_Liners"), and one Service Group (i.e., "Exploration"). This diagram also introduces a new element referred to as an "Interface." Each Interface can optionally be linked or bound to a Tenant or Subtenant. This linkage is either done through an Interface Configuration or inherited on interfaces dedicated to specific Services, as discussed in more detail below. Interfaces that are not Tenant-specific are considered to be Global or in Tenant Zero.

Figure 2:
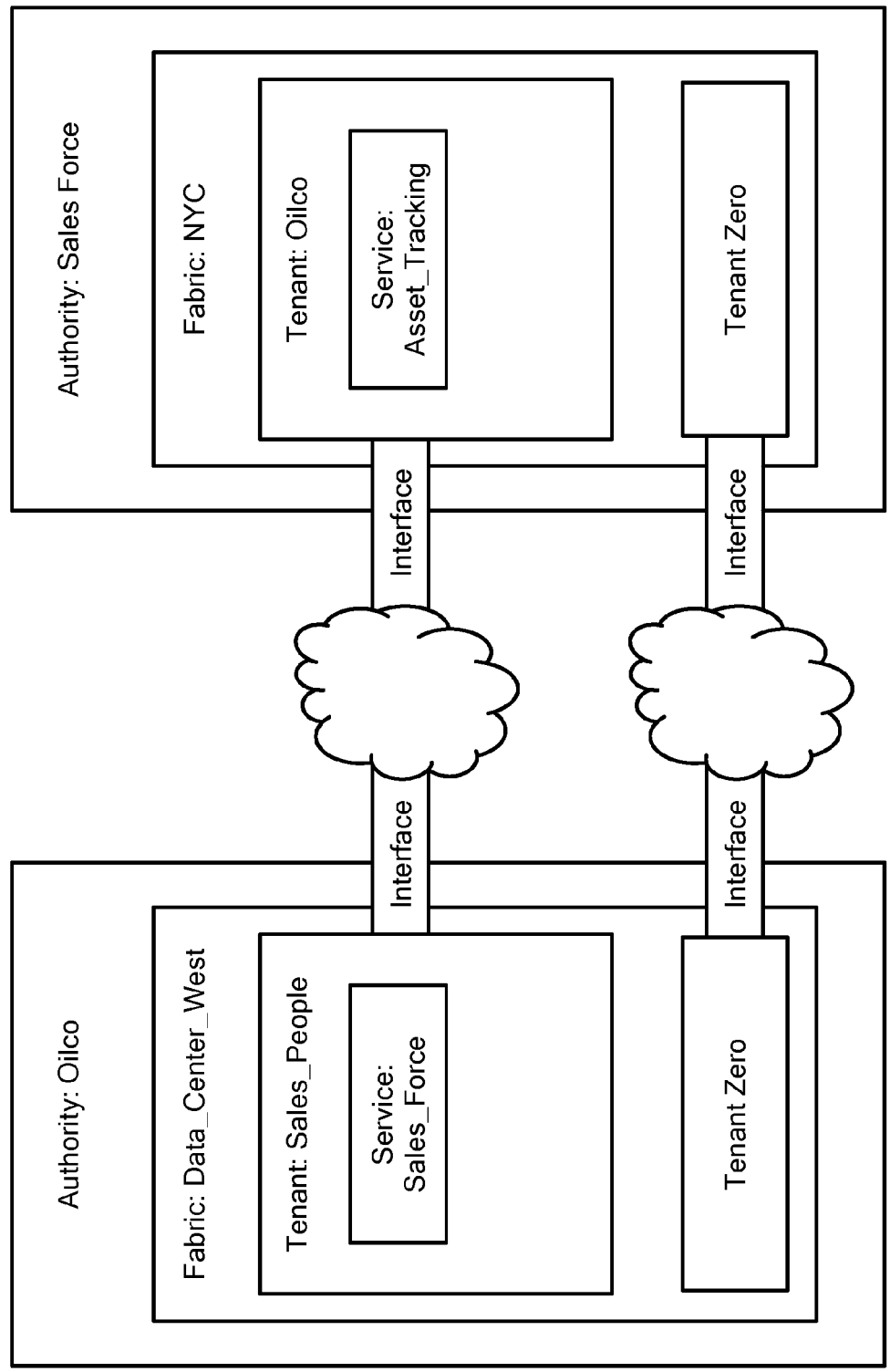
FIG. 2 is a schematic diagram showing REX routing between Fabrics that are in different Authorities, in accordance with one exemplary embodiment.

As demonstrated in FIG. 2, the REX routing protocol also supports routing between Fabrics that are in different Authorities. Specifically, in this example, routes are created between Tenants named "Sales_people" and "Tenant Zero" in the Fabric named "Data_Center_West" in the Authority named "Oilco" and Tenants named "Oilco" and "Tenant Zero" in the Fabric named "NYC" in the Authority named "Sales_Force." It should be noted that the Tenants are defined and have use only within a single Authority. The names of Tenants, Fabrics, Services, and Service Groups are solely at the discretion of the Authority. Thus, it is acceptable for there to be a Tenant named "Oilco" within the Authority named "Sales_Force" even though there is an Authority named "Oilco."

Concept of Routing with Words

In exemplary embodiments, Services or Routes are defined with a QSN. For example, with reference again to FIG. 1, the following named entities are associated with Authority "Oilco":

QSN://Information_Services.Oilco/Asset_Tracking

QSN://Geological_Services.Oilco/Exploration/GeoMapping

QSN://Logistics.Oilco/Exploration/Ocean_Liners

Alternatively, a QSN could reference a Service or Route with an IP Address:

QSN://Logistics.Oilco10.10.1.2

Note that the Destinations do not have a "Fabric" or "Location." The REX protocol associates a Fabric/Location with a Service or Route when a QSN is shared between Fabrics. This allows a definition of Tenants and Services, and their associated policies, without regard to location or Fabric (or even if there are zero or more instances of a Service).

In exemplary embodiments, REX is a unilateral routing protocol. This is similar to current BGP or OSPF/IS-IS routing models where all router adjacencies are defined or declared. Thus, a REX link starts at one Fabric and terminates on another Fabric. Unlike BGP, all routing with REX is defined and controlled on a Fabric to Fabric basis, not on an amorphous Authority level. The inventors consider this to be a major improvement over ASN (Autonomous System Number) based routing. ASNs are very large, cover a very large portion of the earth, and define who owns which IP Address space. However, ASNs do not provide for efficient path determination without complex administrative oversight or controls. Also ASN numbers are limited and difficult to manage. Given the amount of "meet-me" type networking that occurs at co-location facilities, the inventors consider location to be a better path determination criterion than ASN numbers.

In exemplary embodiments, there are two major differences between REX and current IP routing protocols:

First, REX is always between two parties, and there is never any aggregation or repackaging of any routes. This is because REX is not a replacement for current routing protocols, but rather is an extension of capabilities to provide new kinds of secure routing that were not possible before.

Second, REX supports a separation between Service relationships and Transit relationships. Current routing protocols only deal with Transit and are 100% based on IP addresses that are routable, while REX has two types of bilateral relationships, one for obtaining access to a Service (often in a private network), and another for obtaining access to a next hop transit network (public or private).

Actual Routing Destinations are defined within Fabrics. These destinations are actually Service Instances or Transit Routes. These physical instances of a service or route are referred to herein as Service Agents. Service Agents define all of the properties of a specific route instance.

In exemplary embodiments, the REX protocol unilaterally advertises and shares QSNs when there is one or more instance(s) of a Service Agent to bilateral peers. The Fabric that offers the QSN is recorded and associated with the QSN. The advertisement is withdrawn when the number of instances transitions from one or more, to zero. Separately, for adjacent transit networks, the REX protocol updates the routing table with the waypoints of other fabrics (by name). When no local routes satisfy a request, these remote routes will be used. The Fabric (by name) will be used as the target of the route. In exemplary embodiments, all global data objects are shared, for example, utilizing database techniques and/or extensions to the YANG data modeling language for the Network Configuration Protocol ("YANG/NETCONF"), for example, as described in Bjorkland, "YANG—A Data Modeling Language for the Network Configuration Protocol (NETCONF)," Internet Engineering Task Force (IETF) Request for Comments (RFC) 6020, ISSN: 2070-1721, October 2010, which is hereby incorporated herein by reference in its entirety. Importantly, the public addresses of the remote Fabric will be exchanged during this process as well.

Thus, Services in private networks are bilaterally offered to foreign Fabrics. Each of these Services is associated with a named Fabric and Authority. The Services are named, and belong to Tenants. When a path to a Service is needed, the named Fabrics are traversed as needed to obtain a high quality path to the Service. Networks traversed could by any kind of network (e.g., public, private, IPv4, IPv6, or directly connected).

Basic Routing within a Fabric

Some specific exemplary embodiments are now described with reference to routers that can create special routes to force all packets associated with a session to traverse the same set of routers in both directions (referred to herein as "RouteIQ" or "waypoint" routers), for example, as described in U.S. patent application Ser. No. 14/497,954 entitled "NETWORK PACKET FLOW CONTROLLER" and U.S. patent application Ser. No. 14/833,571 entitled "NETWORK PACKET FLOW CONTROLLER WITH EXTENDED SESSION MANAGEMENT," which were incorporated by reference above. A RouteIQ routing fabric (i.e., a set of RouteIQ routers) is capable of routing packets using traditional techniques, such as OSPF, BGP, and IS-IS. The REX protocol is an additional protocol that comingles RouteIQ routes with standard IP routes, to replace or augment them. Selecting the Tenant, choosing a route, and the actual routing of the first packet of a session is described below. In exemplary embodiments, all subsequent packets for the same session are made to follow the first packet such that all packets associated with a session are routed the same way, and the reverse path for packets within the same session are made to follow the same path as the packets traveling in the forward direction (referred to herein as a "bi-flow").

Each RouteIQ router maintains, in a computer-readable medium, a special routing table for each Tenant (referred to herein as the "Forwarding Information Base" or "FIB"). The FIB can contain three types of Service Agent entries:

1. Static routes, which are akin to static IP routes and permit defined pathways for Internet access should it be required from within the tenant;

2. Static service routes, which are for stubbed-in permanent routes, e.g., dedicated servers not directly connected by a Kernel NIC interface (KNI); and 3. Dynamic service routes, which are created at run-time by virtual machines hosted by a RouteIQ SLICE.

First Packet Metadata

To establish a bi-flow, the ingress SLICE (i.e., the first waypoint RouteIQ router) adds additional data to the very first packet of each IP session. This data is referred to herein as "first packet metadata" and includes:

The desired QSN
The desired IP Address (if local to the fabric)
The desired Class of Service
The original source IP address and port
The original destination IP address and port
Other policies and controls (as needed)

This metadata is only understood by RouteIQ routers, and is only included when the RouteIQ router knows that a downstream router supports REX. The metadata is used to signal information about a session from one RouteIQ router to another. In exemplary embodiments, first packet metadata is sent in the forward direction until a backward (reverse) metadata packet has been received, since it is possible that packets can be dropped. For TCP sessions, this is always the SYN/ACK; for UDP protocols, it may take several transmissions before the first backward packet is received.

Metadata is also included in the first backward (reverse) packet. This metadata includes:

Utilization metrics, to be used as input for load balancing (CPU load, memory, active sessions, etc.)
Assigned Tenant
Possible modifications to Service Class (e.g., promotion/demotion)

In this exemplary embodiment, metadata is only included in each direction during link establishment (i.e., within the first packet sent between two SLICEs), although alternative embodiments additionally may send metadata for other events, such as when a fast re-route is being performed during a session, or to modify a negotiated Service Class dynamically.

First Packet Processing

When a first packet of a session is detected by a RouteIQ router, the following steps occur. The steps below assume the arriving packet may or may not have metadata inserted by a previous RouteIQ router (fabric).

Step 1: Determining the Source Tenant

To find a route, the first step is to ascertain the correct source Tenant. The source Tenant can be determined by one of several methods, such as, for example:

Associated with an interface
Associated with a packet that originates from a Service
Stored in the first packet metadata by a previous hop RouteIQ instance Interfaces that connect to specific physical network areas can be configured to be part of a Tenant. Services optionally also can be associated with a Tenant when started; when packets arrive or egress from a Service Agent, these packets will inherit the Tenant from that Service Agent's associated Service automatically. When networking between REX Tenants, Fabrics, and Authorities, metadata present in the first packet will contain the requested Tenant. These configured Tenant names can consist of any string of text, with a hierarchy defined using periods as separators. For example:

computers.asset_tracking

This defines two Tenants: computers, and computers.asset_tracking; furthermore, it defines computers.asset_tracking as a child of asset_tracking. The tenant asset_tracking includes computers.asset_tracking, and computers.asset_tracking inherits all attributes from asset_tracking.

Tenant Zero is the term given to the default global tenant used when no tenant has otherwise been explicitly defined. Tenant Zero is associated with traffic from sources that are outside of the authority (e.g., Internet traffic).

Step 2A: Lookup a REX Service—No Metadata Present

When a SLICE receives a packet without metadata (i.e., an ordinary first packet), it initially sets the Tenant for this session to be the Tenant associated with the ingress interface if one is assigned (otherwise the packet is considered to be associated with Tenant Zero). If the packet's source address matches a Service address, the SLICE then updates the Tenant to be that associated with the Service; likewise, if the packet's source address matches a Service Agent address, the SLICE updates the Tenant to be the one associated with that Service Agent's Service.

The SLICE then searches the FIB associated with that Tenant for routes (a global FIB is used for Tenant Zero). The SLICE extracts the destination IP address from the packet, and performs a longest prefix match to search for service routes. If there are no routes available that match the IP Address within the Tenant's FIB, then the packet is returned with the appropriate ICMP "no route found" treatment.

Note that the FIB can contain all three kinds of routes, i.e., Service Agents, Static IP Routes, and Learned IP Routes. Only the routes appropriate for a Tenant will be searched. The Global FIB for Tenant Zero contains all of the IP Routes learned from BGP/OSPF/IS-IS and any locally defined routes, although these global routes will not be present within a specific Tenant. In an exemplary embodiment, if a Tenant is to have a path to the Internet, it must be defined formally as a Route within the Tenant.

If the SLICE finds one or more matching Service Agent instances, it then determines which instance to use. At this point, the access policy is enforced to eliminate from that list any Service Agents that do not conform to the policy. Each Service has one or more access policies that dictate who or what is permitted to use that Service. The policy can contain an IP address prefix, or it can contain Services by name using a QSN—either fully qualified, or a partial QSN indicating only a service-group or tenant (each of these access policies has an allow/deny setting, akin to a traditional ACL). Thus, access policies can be based on previously defined services, creating an effective and simple model.

Figure 3:
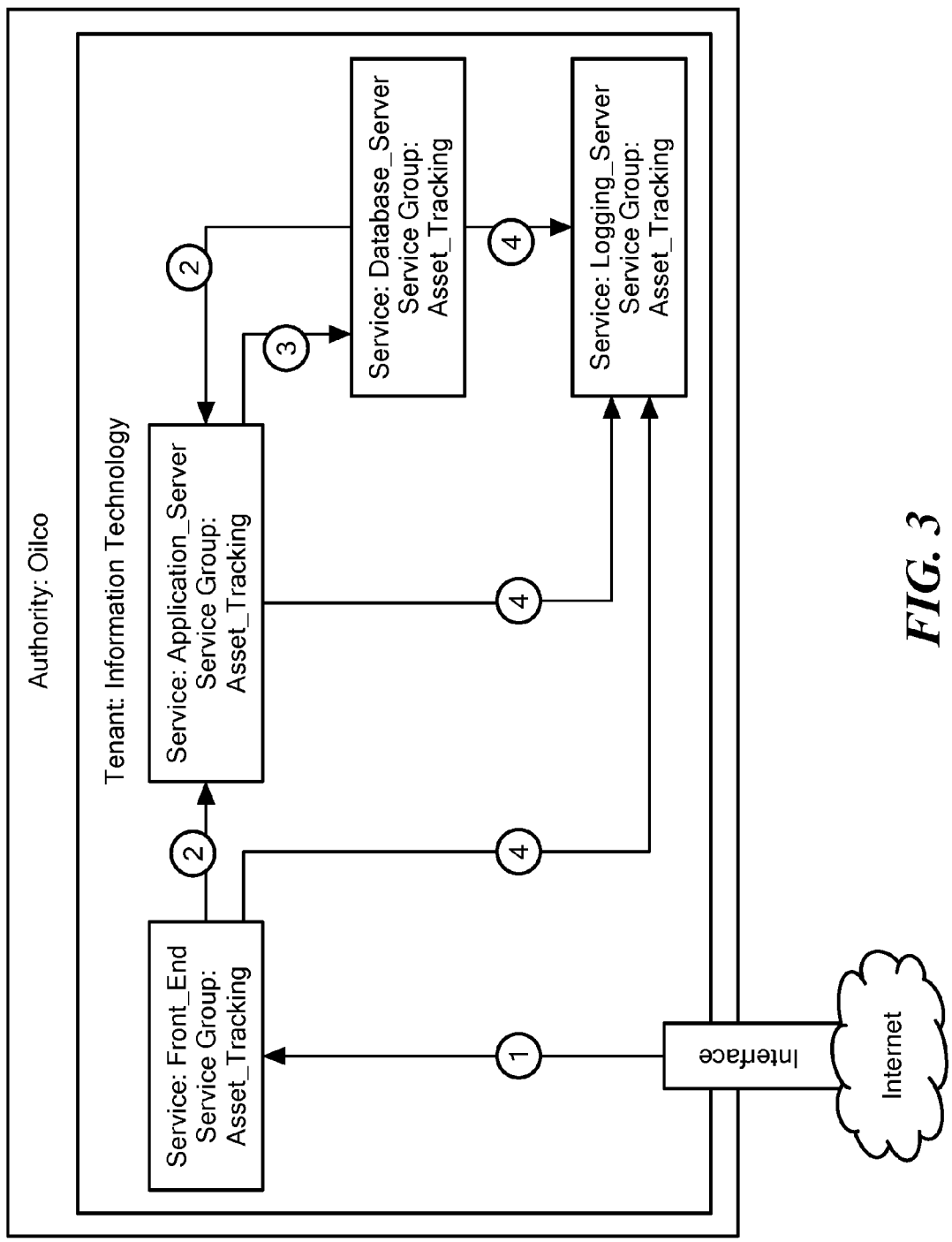
FIG. 3 is a schematic diagram showing REX routes between Services that are shared across an Authority, in accordance with one exemplary embodiment.

Table 1 schematically shows exemplary Tenant and Service FIB entries shared across an Authority for the example shown in FIG. 3:

TABLE 1

Route Tenant/Service Definitions

1   Service Address: 210.45.32.21 (Allocated public address)
    a) Service Name: "Front_End"
    b) Service Group: "Asset_Tracking"
    c) Access Policy: None
2   Service Address: 10.0.0.1 (allocated private address within Tenant)
    a) Service Name: "Application_Server"
    b) Service Group: "Asset_Tracking"
    c) Access Policies:
        i) QSN://Information_Technology.Oilco/Asset_Tracking/
           Front_End
        ii) QSN://Information_Technology.Oilco/Asset_Tracking/
           Database_Server
3   Service Address: 10.0.0.2 (allocated private address within Tenant)
    a) Service Name: "Database_Server"
    b) Service Group: "Asset_Tracking"
    c) Access Policy:
        i) QSN://Information_Technology.Oilco/Asset_Tracking/
           Database_Server TABLE 1-continued Route Tenant/Service Definitions 4   Service Address: 10.0.0.3 (allocated private address within Tenant)
    a) Service Name: "Logging_Service"
    b) Service Group: "Asset_Tracking"
    c) Access Policies:
        i) QSN://Information_Technology.Oilco/Asset_Tracking/
           Front_End
        ii) QSN://Information_Technology.Oilco/Asset_Tracking
           Application_Server
        iii) QSN://Information_Technology.Oilco/Asset_Tracking/
           Database_Server It should be noted that such Service definitions, policies and relationships to each other are defined globally across the entire Authority, i.e., across all Fabrics in the Authority. Not shown are other policies for bandwidth and quality of service that also may be associated with each Service definition.

In this example, route 4 has three different access policies that are associated with different originating services. In an exemplary embodiment, these are compressed into a single FIB route entry with an array of access policies. In this example, routes 2 and 3 are two routes that are used to create a two-way communication path for first packets, which often may be required for UDP services that communicate bi-directionally, where the first packet for a session could arrive from either direction.

Once the SLICE has determined the Service Agent, the SLICE then determines how the packet is to be routed. The RouteIQ routers exchange information allowing each RouteIQ router to determine whether or not the next-hop router is a RouteIQ router. Assuming the next-hop router for the packet is a RouteIQ router, the SLICE inserts first packet metadata into the packet and forwards the packet. In exemplary embodiments, the first packet metadata includes an authentication signature, which allows the next-hop RouteIQ router to verify the metadata.

Step 2B: Lookup a REX Service—Metadata Present

When a SLICE receives a first packet that includes first packet metadata, it first validates the metadata using the authentication signature information included in the metadata. Assuming the metadata is valid, the SLICE extracts the Service name and Tenant from the metadata, and then selects a corresponding FIB associated with that Tenant.

The SLICE then searches the FIB by the Service name, and a resultant set of Service Agents that best match the name is returned. In exemplary embodiments, the name must be an exact match, and no partial matches are accepted for received metadata Services. If there is no match, an appropriate ICMP "no match found" message is returned. Next the returned Service Agents are processed in the order defined below.

1. Local to SLICE: If one or more Service Agents are locally supported (the waypoint or fabric address are owned by the SLICE), then these represent the complete list of next hop possibilities. Based on local knowledge of capacity, bandwidth, and defined policies, the correct Service Agent is chosen, as described in greater detail below.

2. Local to Fabric but Foreign to SLICE: If none of the returned Service Agents meets the criteria of #1 above, but one or more have the same Fabric name as the SLICE processing the packet, then the correct Service Agent is chosen from this list using Fabric information obtained using Bidirectional Forwarding Detection (BFD) as discussed below, and by using backward soft state information returned from previously routed sessions.

3. Foreign to Fabric: If none of the returned Service Agents meets the criteria of either #1 or #2 above, then the remaining Service Agents will contain foreign or remote Fabric names. These foreign/remote fabrics will be reviewed for prioritization and one next-hop fabric will be chosen.

Step 3: Routing of Sessions to Service Agents (Service Instances)

Figure 4:
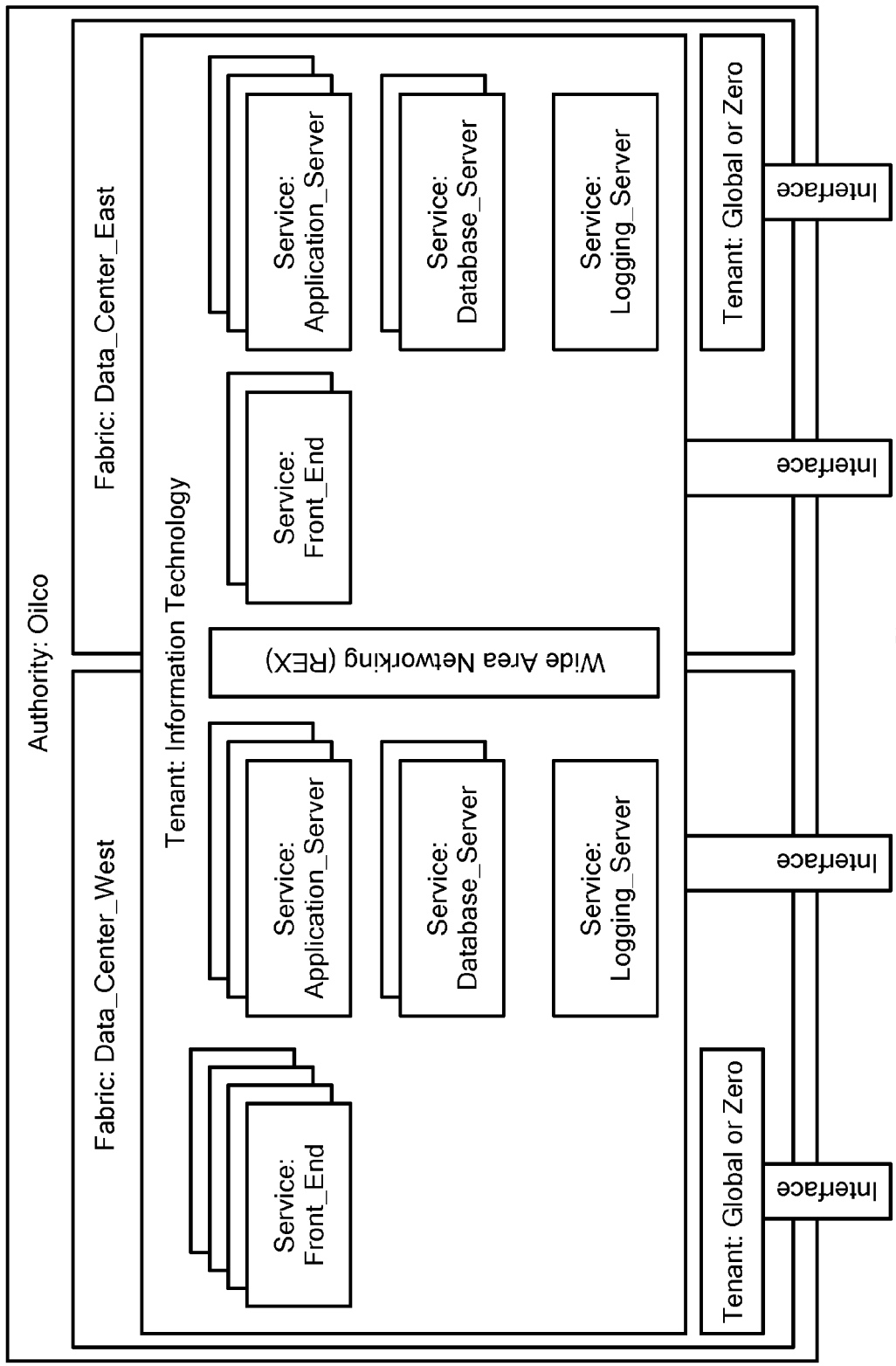
FIG. 4 is a schematic diagram showing support for multiple REX Service Agent instances, in accordance with one exemplary embodiment.

In this example, all of these routes are in an Authority, and a single Tenant, but possibly spread out over multiple Fabrics. Also, there could be multiple instances of a given Service. For example, FIG. 4 shows an exemplary configuration in which Fabric Data_Center_West includes four Front End Service instances (e.g., actual application servers), three Application Service instances, two Database Service instances, and one Logging service instance, while Fabric Data_Center_East includes two Front End Service instances, two Application Service instances, two Database Service instances, and one Logging service instance.

In exemplary embodiments, the instances are accounted for with Service Agents. Service Agents are data objects that define individual route instances, such as these services. It is conceivable that there may be zero instances at certain times. Services in this example are all application related servers, but from a networking perspective, they are just IP Address Endpoints. Service Agent definitions are attached to the services described above, and all share the same service definitions and access policies. Table 2 and Table 3 are exemplary FIBs for the Fabrics shown in FIG. 4:

Thus, for example, there are six instances associated with the Front_End_Service for Tenant Information_Technology: four on the west fabric (i.e., entries 1-4), and two on the east fabric (i.e., entries 1-2).

A specific instance can be selected in any of a variety of ways. The access policy (already discussed) eliminates undesirable services. Once this pruning has been performed, there are additional policies that can be employed.

Each Fabric has its own list of Service Agents for each Service. This data is private data. The REX routing protocol will put a universal single Service Agent into a foreign Fabric that has networking privileges to access this Service. This special "pointer" to a Fabric has no IP addresses associated with it, just the name of the Fabric. When a FIB entry contains one of these pointers to a remote Fabric (and the FIB entry is chosen as the best), then automatically a transit service to get to the remote Fabric is executed, as described below.

In exemplary embodiments, the Service Agents on a local Fabric are always preferred over any found in remote Fabrics. Multi-fabric routing is discussed in greater detail below.

In exemplary embodiments, security policies are used to describe the encryption and authentication requirements for a specific service. If a security policy is applied to a tenant, all traffic in that tenant's network will use the prescribed encryption mechanism. If a security policy is applied to a

TABLE 2

Sample FIB for Fabric: Data Center West

| Entry No. | Tenant | Service | Fabric | Fabric Address or Waypoint | Service Policies | Security Policies |
|---|---|---|---|---|---|---|
| 1 | Information_Technology | Front_End_Service | Data_Center_West | 172.1.1.1 | TBD | TBD |
| 2 | Information_Technology | Front_End_Service | Data_Center_West | 172.1.1.2 | TBD | TBD |
| 3 | Information_Technology | Front_End_Service | Data_Center_West | 172.1.1.3 | TBD | TBD |
| 4 | Information_Technology | Front_End_Service | Data_Center_West | 172.1.1.4 | TBD | TBD |
| 5 | Information_Technology | Application_Service | Data_Center_West | 172.1.1.5 | TBD | TBD |
| 6 | Information_Technology | Application_Service | Data_Center_West | 172.1.1.6 | TBD | TBD |
| 7 | Information_Technology | Application_Service | Data_Center_West | 172.1.1.7 | TBD | TBD |
| 8 | Information_Technology | Database_Service | Data_Center_West | 172.1.1.8 | TBD | TBD |
| 9 | Information_Technology | Database_Service | Data_Center_West | 172.1.1.9 | TBD | TBD |
| 10 | Information_Technology | Logging_Service | Data_Center_West | 172.1.1.9 | TBD | TBD |
| 11 | Information_Technology | Front_End_Service | Data_Center_East | NA | NA | NA |
| 12 | Information_Technology | Application_Service | Data_Center_East | NA | NA | NA |
| 13 | Information_Technology | Database_Service | Data_Center_East | NA | NA | NA |
| 14 | Information_Technology | Logging_Service | Data_Center_East | NA | NA | NA |

TABLE 3

Sample FIB for Fabric Data_Center_East

| Entry No. | Tenant | Service | Fabric | Fabric Address or Waypoint | Service Policies | Security Policies |
|---|---|---|---|---|---|---|
| 1 | Information_Technology | Front_End_Service | Data_Center_East | 172.1.1.1 | TBD | TBD |
| 2 | Information_Technology | Front_End_Service | Data_Center_East | 172.1.1.2 | TBD | TBD |
| 3 | Information_Technology | Application_Service | Data_Center_East | 172.1.1.3 | TBD | TBD |
| 4 | Information_Technology | Application_Service | Data_Center_East | 172.1.1.4 | TBD | TBD |
| 5 | Information_Technology | Database_Service | Data_Center_East | 172.1.1.5 | TBD | TBD |
| 6 | Information_Technology | Database_Service | Data_Center_East | 172.1.1.6 | TBD | TBD |
| 7 | Information_Technology | Logging_Service | Data_Center_East | 172.1.1.7 | TBD | TBD |
| 8 | Information_Technology | Front_End_Service | Data_Center_West | NA | NA | NA |
| 9 | Information_Technology | Application_Service | Data_Center_West | NA | NA | NA |
| 10 | Information_Technology | Database_Service | Data_Center_West | NA | NA | NA |
| 11 | Information_Technology | Logging_Service | Data_Center_West | NA | NA | NA | service, then this will override any configured policy on a given tenant. This behavior allows for fine-grained control of what types of encryption should be applied at the tenant or service.

As discussed herein, service policies define all of the expected "per session" attributes, including a service class that defines routing priorities, DSCP, and path selection support through quality points.

In exemplary embodiments, the selection of a specific Service Agent takes into account the load balancing strategy defined in the Service's service policy, as well as two types of dynamic load balancing information, namely Internal fabric path utilization information and Service path availability information.

Internal fabric path utilization information is data about the "Fabric" that interconnects all of the SLICEs. In an exemplary embodiment, this information is obtained using Bidirectional Forwarding Detection (BFD) with extensions to measure packet loss between SLICEs. Round Trip Time (RTT) is recorded and used for future sessions to the same destination service agent; differences in RTT in successive samples are used to measure jitter. All internal SLICEs communicate using BFD so that all internal path attributes within a routing fabric are known.

Service path availability information is gathered in real time by a SLICE supporting one or more service agents for a given service. This information is sent in the metadata attached to the first packet sent in the reverse direction. This information includes session counts, bandwidth rates for a service, etc.

The Service Agent chosen has an IP address (labeled "Fabric Address or Waypoint" in the table above) that depending on perspective has either one of two names: within a fabric it is called a "fabric address", and external to a fabric it is called a "waypoint". The first packet is forwarded to this IP address, after inserting first packet metadata that contains all of the service routing information required. This metadata includes all of the text string fields used for networking.

Basic Routing Between Fabrics within a Single Authority

Figure 5:
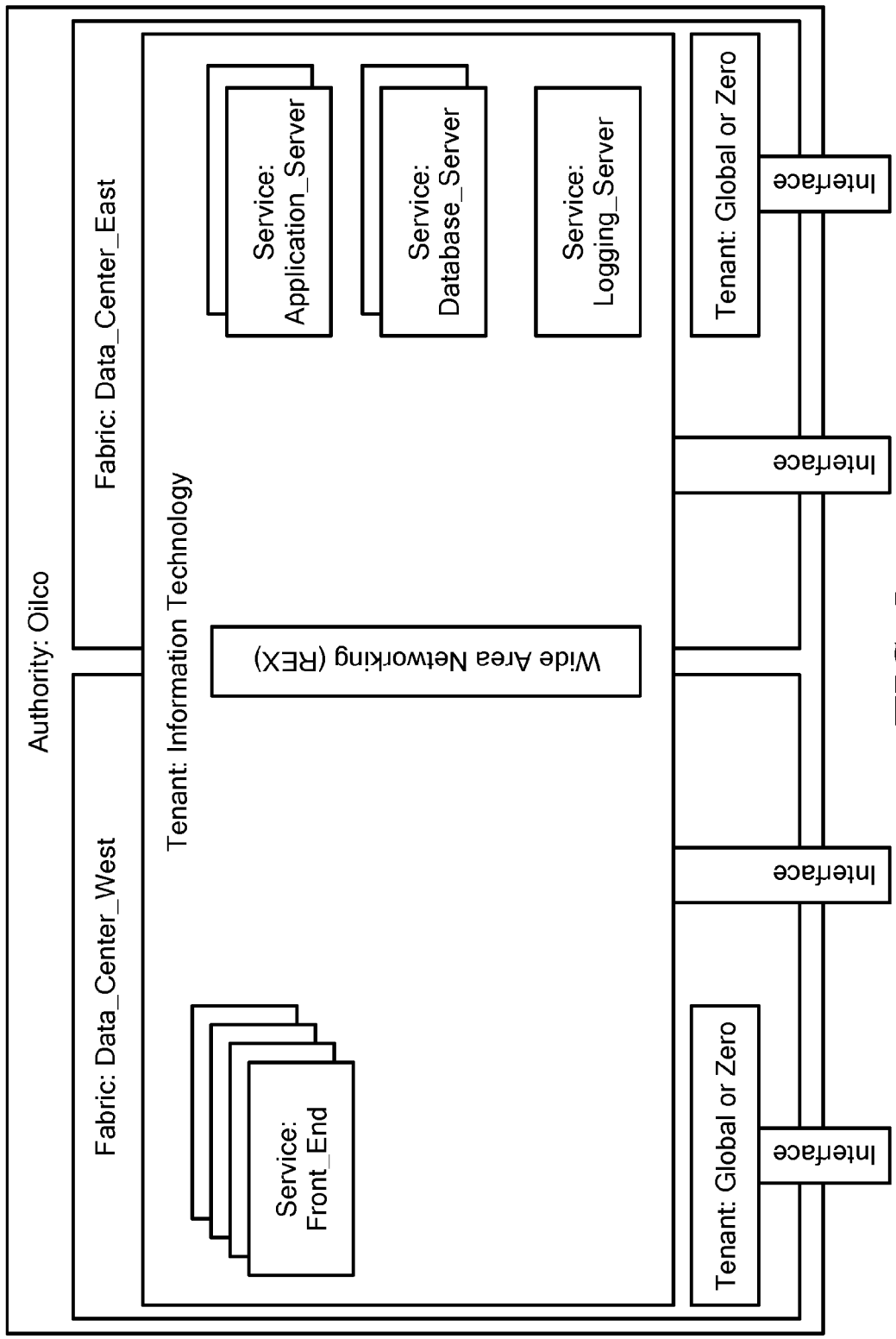
FIG. 5 is a schematic diagram showing a collection of Services spread across multiple Fabrics, in accordance with one exemplary embodiment.

Normally, all aspects of a Service Group are provisioned to be within a single fabric. However, there can be cases where a collection of Services is spread across multiple Fabrics, for example, as shown in FIG. 5. Here, the Front End Service is in a different Fabric (Data_Center_West) than the rest of the Services in the group (located in Data_Center_East). The two data centers could be separated by a large distance (e.g., thousands of miles) and could have multiple pathways between them.

REX allows two fabrics to directly interact in very efficient ways. The Route Exchange involves three basic steps:

Step 1: Declare Adjacency

All Fabrics within a single Authority are automatically declared adjacent. As discussed above, all global data objects are shared, for example utilizing database techniques and/or extensions to YANG/NETCONF. Importantly, the public addresses of the remote Fabric ("waypoints") will be exchanged during this process as well. As shown in FIG. 5, Tenants and Services are global. Also global within an Authority are service classes and session types. Among other things, this ensures that Quality of Service (QoS) treatments will be uniform.

Step 2: Mesh-Up Process

A process (referred to herein as the "mesh-up" process) is used to turn logical adjacency into physical adjacency. This step is automated, and essentially includes all of the requirements for what is generally known as Software-Defined WAN (SD-WAN), including multi-path routing with an emphasis on applications and features.

Figure 6:
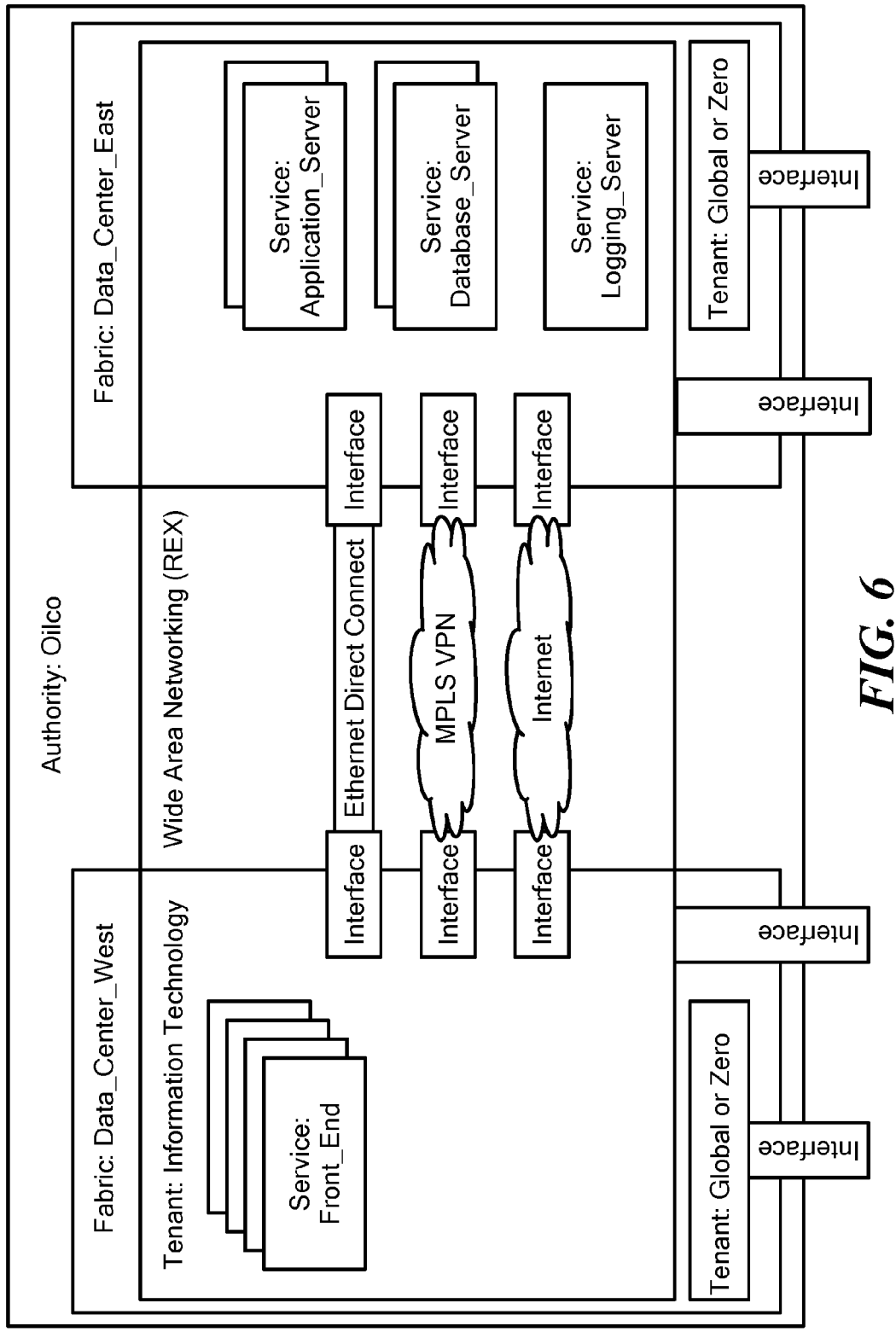
FIG. 6 is a schematic diagram showing two Fabrics that can be interconnected in many ways, in accordance with one exemplary embodiment.

FIG. 6 schematically shows two Fabrics that can be interconnected in many ways. Each method of interconnect has various attributes. For example, MPLS can provide a private or tunneled connection between the data centers but might be expensive to use, while direct connections (e.g., Ethernet Pseudowires, Direct Internet Access via a single carrier) can provide dedicated bandwidth with privacy.

At times, the public Internet will be used for interconnecting fabrics. Each link has its own performance, cost and SLA factors associated with the connection. These factors are captured through the quality-points model described below.

The Mesh-Up Process begins shortly after adjacency is established. The Mesh-Up Process is automated, and it begins with an exchange of externally facing waypoint addresses allocated for networking. In the case below, there are three IP addresses in Data_Center_West, and three in Data_Center_East.

Each Fabric's CORE (East and West in this example) looks up externally facing waypoints that are to be considered "candidates" for connectivity. In exemplary embodiments, all externally facing waypoints are considered as candidates for connectivity, but in alternative embodiment, additional controls may be used to determine which waypoints to use for specific adjacencies.

Typically, these waypoint candidates are sent through the REX protocol from each Fabric to the other. For example, with reference to the example shown in FIG. 7, East sends West G, H, and I, and West sends East D, E, and F. In alternative embodiments, waypoint candidates are sent in only one direction, when only one Fabric has a Service to consume.

Step 3: Assess Reachability

The next step in the Mesh-Up Process is to assess the IP Addresses received from the other Fabric for reachability.

1) Any Private (RFC1918) Address is assumed reachable.

2) Public addresses are processed through the OSPF/BGP/IS-IS Routing table to determine how many AS Hops away the IP Address is, or what the cost or distance is. These numbers are used to prioritize these routes.

3) Starting with Private Addresses first, a connectivity check is performed with BFD. The BFD message contains authentication information (sometimes referred to as "authentication cookies") so that it cannot be spoofed by an attacker. If a SLICE on the proper fabric receives this BFD message, it responds. The response includes information about the interface (e.g., size, Class of Service, Quality Points supported, etc.). The Class of Service is a set of computed or culled information from the pathway that includes Quality Points, Service Classes supported, as well as latency and packet loss measurements. Quality Points are an indication of the quality of a given pathway and can be used to prioritize pathways when more than one pathway is available for a given communication session. Once a response is received, the IP Address is kept as a candidate.

4) Public addresses are likewise tested with a connectivity check. If there is a response, the information is also recorded.

5.) Non-Working addresses are kept but recorded as non-working or out-of-service (OOS).

The Mesh-Up Process is performed by both sides, with each SLICE having an external interface, and each side looking for and testing connectivity with the shared addresses. As soon as there is at least one working address, then the Fabric-to-Fabric connection is declared operational. Once operational, BFD is used to test connectivity at predetermined BFD intervals (the configuration for BFD intervals may be defined as part of the RouteIQ router configuration). If an interface becomes non-working, then it is added to the non-working (OOS) addresses list. If and when there are no remaining working interfaces, the fabric-to-fabric connection is disabled, in which case an alarm notification may be generated (e.g., to a network administrator). In exemplary embodiments, BFD is performed on all previously working links to test for links coming back into service, and BFD is also performed on addresses that never worked, although such testing may be performed less frequently than testing of previously working links. Addresses that begin to work will be added to the connection. Any change in externally available waypoints will generate an update to all existing Mesh-Ups.

On each side, as soon as a "mesh-up" is determined, a specific transit service to the Fabric reached is created in the local FIB. These transit routes are automatic and are solely added/removed based on the status of a peer mesh. This Fabric-to-Fabric mapping may be included in the standard FIB or may be maintained in a separate inter-Fabric FIB. In essence, the Fabric-to-Fabric mapping represents the EGP table, as opposed to the IGP table defined by the standard FIB.

Figure 7:
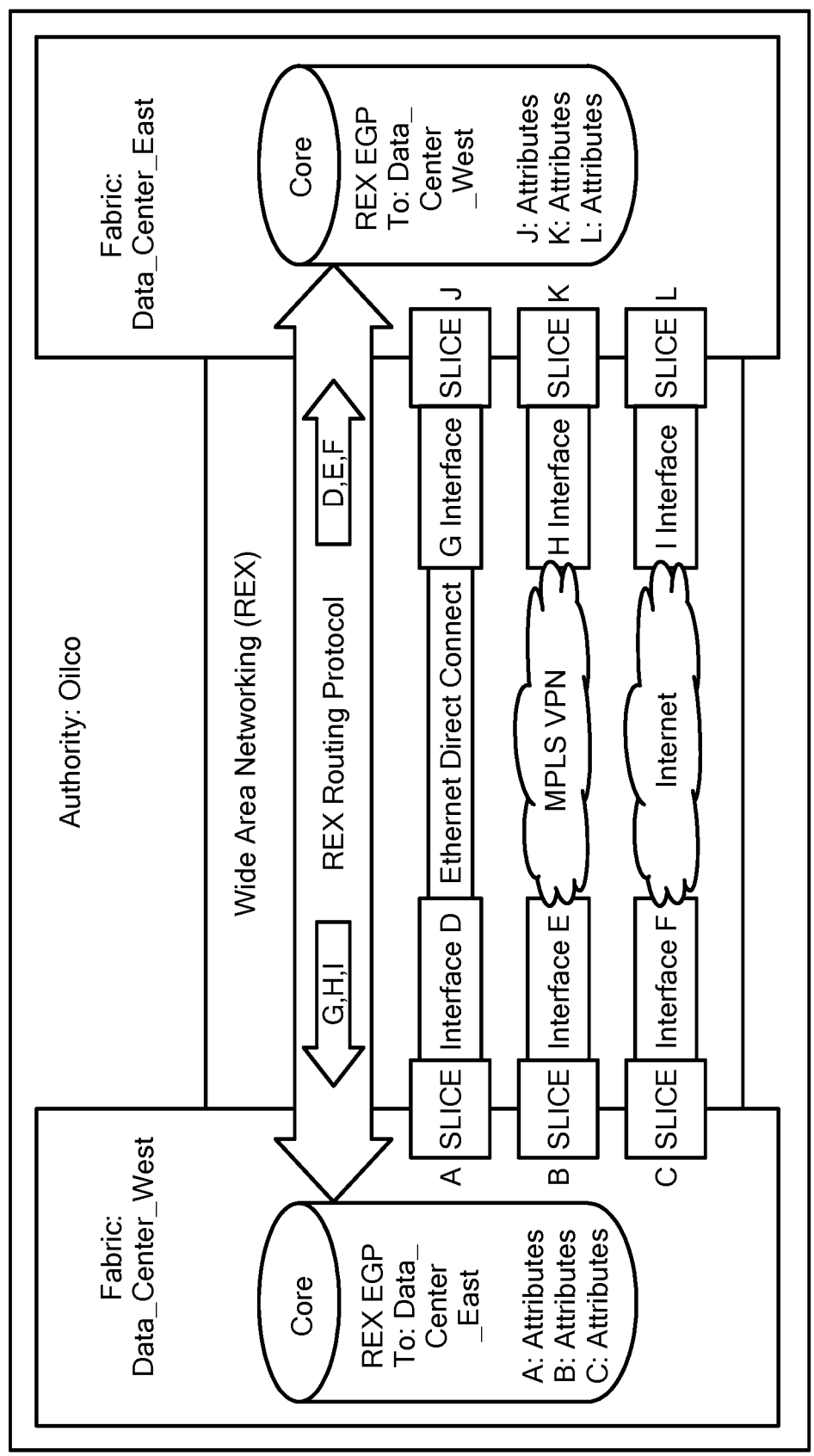
FIG. 7 is a schematic diagram showing the exchange of waypoint candidate information between two Fabrics, in accordance with one exemplary embodiment.

Table 4 shows an exemplary Fabric-to-Fabric mapping FIB for Data_Center_East based on the example shown in FIG. 7:

TABLE 4

| To Fabric | Use Waypoint | Round Trip Time | Packet Loss | Capacity | Service Class | Quality Points |
|---|---|---|---|---|---|---|
| Data_Center_West | D | 100 | 0.001 | 50 Meg | Voice | 80 |
| Data_Center_West | E | 120 | 0.004 | 1 Gig | Secure Data | 50 |
| Data_Center_West | F | 150 | 0.010 | 10 Gig | Best Efforts | 40 |

Table 5 shows an exemplary Fabric-to-Fabric mapping FIB for Data_Center_West based on the example shown in FIG. 7:

TABLE 5

| To Fabric | Use Waypoint | Round Trip Time | Packet Loss | Capacity | Service Class | Quality Points |
|---|---|---|---|---|---|---|
| Data_Center_East | G | 95 | 0.002 | 50 Meg | Voice | 80 |
| Data_Center_East | H | 125 | 0.003 | 1 Gig | Secure Data | 50 |
| Data_Center_East | I | 145 | 0.009 | 10 Gig | Best Efforts | 40 |

The Fabric-to-Fabric mapping FIB is different than the FIB used inside the Fabric. Specifically, this FIB supports both directly adjacent Fabrics and a map to Fabrics that are more than one hop away. For example, with reference to the example shown in FIG. 8, there are two possible pathways to get to Data_Center_East from Data_Center_West:

Data_Center_West→Fabric 2→Fabric 3→Data_Center_East

Data_Center_West→Fabric 2→Fabric 4→Data_Center_East

In exemplary embodiments, the Adjacent Fabric Map that will be created in each Fabric will look like any BGP table, except that instead of Autonomous Systems, it will be based on Fabrics that are named.

Figure 8:
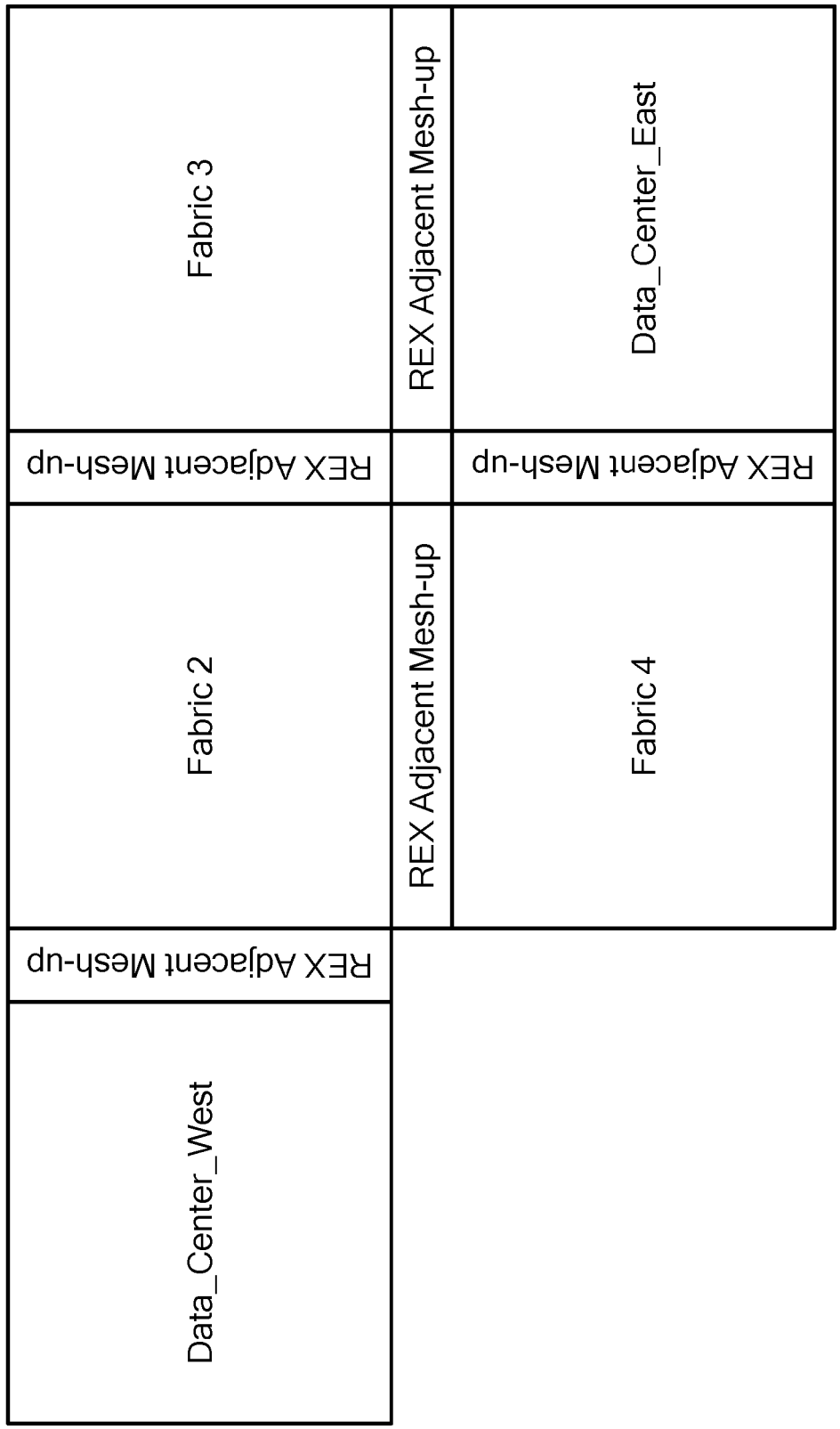
FIG. 8 is a schematic diagram showing Fabric adjacencies, in accordance with one exemplary embodiment.

Table 6 shows an exemplary Adjacent Fabric Map for Data_Center_West based on the example shown in FIG. 8.

TABLE 6

| Destination Fabric | Next Fabric Hop | Number of Hops | Class of Service Supported |
|---|---|---|---|
| Fabric 4 | Fabric 2 | 1 | Voice, Data, Etc. |
| Fabric 3 | Fabric 2 | 1 | Voice, Data, Etc. |
| Data_Center_East | Fabric 2 | 2 | Voice, Data, Etc. |

Table 7 shows an exemplary Adjacent Fabric Map for Data_Center_East based on the example shown in FIG. 8:

TABLE 7

| Destination Fabric | Next Fabric Hop | Number of Hops | Class of Service Supported |
|---|---|---|---|
| Data_Center_West | Fabric 3 or Fabric 4 | 2 | Voice, Data, Etc. |
| Fabric 2 | Fabric 3 or Fabric 4 | 1 | Voice, Data, Etc. |

For Data_Center_East, it should be noted that Fabric 2 and Data_Center_West can be reached via Fabric 3 or Fabric 4. Thus, when setting up the Adjacent Fabric Map or when using the Adjacent Fabric Map, one of the candidate next-hop Fabrics needs to be selected, as discussed below. If connectivity via the selected Fabric is lost, then the Adjacent Fabric Map can be updated to use another available Fabric as the next-hop Fabric (e.g., Table 5 could be updated to use Fabric 4 rather than Fabric 3 as the next-hop Fabric).

Step 4: Service Exchange

Service Agents will be created by the REX protocol when Services are shared, e.g., based on policy and/or filters. In each remote site, a single Service Agent will be created on the remote site's Fabric as a representative of the Fabric that has the one or more actual Service Agents. In exemplary embodiments, a single FIB entry is used no matter how many Service Agents exist remotely.

If the number of Service Agents on a network reduces to zero, or if at run-time it is determined that no Service Agents exist, then the remote site's representative Service Agent (Fabric pointer) is removed from the FIB. If this Service Agent (Fabric pointer) is used before it is removed from the FIB, then any first packet attempt will be returned with ICMP NO ROUTE, which will effectively signal that there are no Service Agents in that Fabric.

Runtime Execution

In exemplary embodiments, at run time, when a packet arrives, local Service Agents are always chosen first. In the event that no local Service Agents exist, or they are all full or out of service, the following occurs. The list of Fabrics available for a service is determined by reviewing the Service Agent information. There will be a single FIB entry for each remote of Fabric Service location. The best Fabric to use (if there is more than one remote Fabric) is determined, for example, by one of the following:

1.) Countries are the same
2.) Closest geographically
3.) Quality Points
4.) BFD computed link latency
5.) Number of AS Hops (0=same, 1-n)
6.) IGP Distance Each Authority determines the weight and order of these according to a predetermined selection scheme.

Once a Fabric is selected, the first packet is prepared for routing by inclusion of two kinds of metadata. The first metadata includes the original addresses, the chosen service route, Tenant, original Fabric, terminal Fabric and it is signed by the original Fabric with its service routing credentials. The second metadata includes the Waypoint addresses for the Fabric-to-Fabric transport, the original Fabric, the next hop Fabric, and is signed by the original Fabric with its transport credentials.

The packet is forwarded to the waypoint address of the Fabric. The terminating Fabric checks the authentication (signature) and, upon a valid result, removes the transit metadata and processes the packet by selection of a Service Agent locally.

In exemplary embodiments, all subsequent packets of the session are made to follow the path of this first packet in both the forward and revise direction, as discussed above.

Autority-to-Authority Routing

The REX protocol can also be used between Fabrics that are created, managed and controlled by different Authorities. In these cases, REX operates as described above, except that the Tenants and Service definitions will not be shared. Services will be made available by name, and remote authorities will need to remember (store) and utilize the Tenant that was provided to them in the REX exchange. Services, Tenants, and their associated policies will be advertised to selected REX peers.

As but one example of how the REX system could be used, users could log onto a web site and find services or other users they want to network with. Once found, then a directed REX Service adjacency can be established through a REX exchange. For example, a Service may be offered from a near side Authority to a remote Authority, or a Service may be requested by name from a far side Authority. Thus, Service Routes may be either PUSHED or PULLED as required. The exact setup is preceded by a mutual agreement to establish the service link. The Service owner assigns a Tenant and Sub-Tenant to use when sending sessions to the Service. Among other things, this will allow the Service owner to determine a priori what Tenant a remote user should use.

In either case, the Tenants are "mapped" at time of service offering. This mapping is remembered (stored) by the remote side in a very simple way. Each networking service offered/requested results in a FIB Entry within the near side Tenant with a pointer to the correct Fabric. The "map-to" tenant is stored in the Service Agent Fabric pointer as well. The rest of the networking scenario operates as discussed above.

Some Special Cases

When there are no Services available at the moment a packet arrives at a Fabric, a reply to the packet includes an appropriate response understood by RouteIQ originating routers as "no service available." For example, in exemplary embodiments, at the very ingress edge, the RouteIQ router may return an ICMP DESTINATION UNREACHABLE message (Code 2) per RFC 1122, although in alternative embodiments, a second path (if it exists) may be attempted prior to sending an ICMP DESTINATION UNREACHABLE response. When it is determined that there are no services reachable at a point in time, all subsequent packets for a programmable guard time will receive the appropriate ICMP DESTINATION UNREACHABLE response.

When there is a valid IP route but there is no matching protocol (only applicable to RouteIQ routes, since regular routes do not specify protocol types), then the SLICE preferably returns a message such as ICMP DESTINATION UNREACHABLE (Code 2) per RFC 1122.

Rex Router and System

Figure 9:
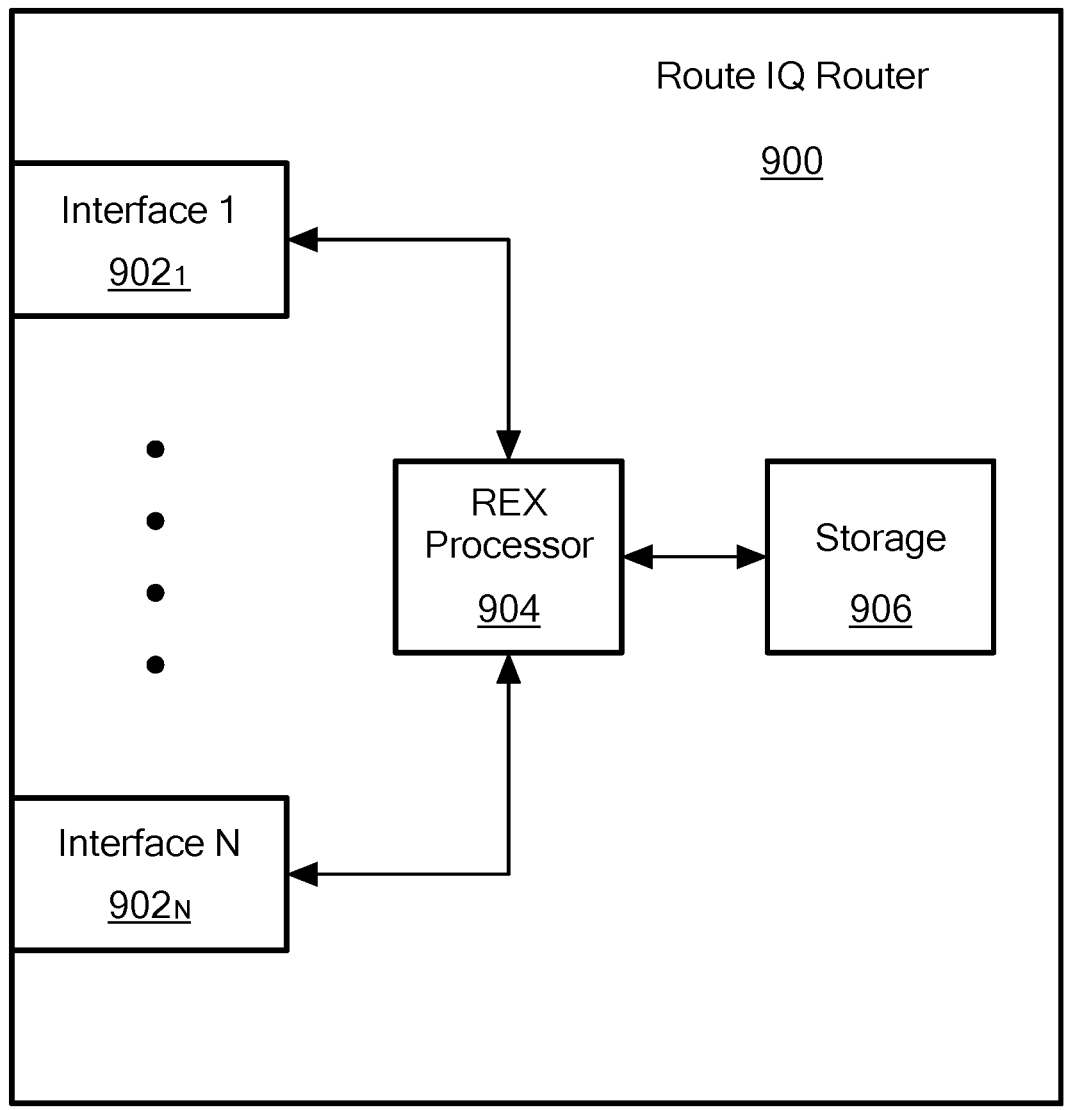
FIG. 9 is a schematic block diagram of a RouteIQ router, in accordance with one exemplary embodiment.

FIG. 9 is a schematic block diagram of a RouteIQ router 900, in accordance with one exemplary embodiment. Among other things, the RouteIQ router 900 includes a number of interfaces $902_1$ through $902_N$ (which may be referred to collectively as interfaces 902), a REX processor 904, and storage 906. The REX processor 904 maintains the various types of FIBs in the storage 906 and performs the various REX functions as described above.

Figure 10:
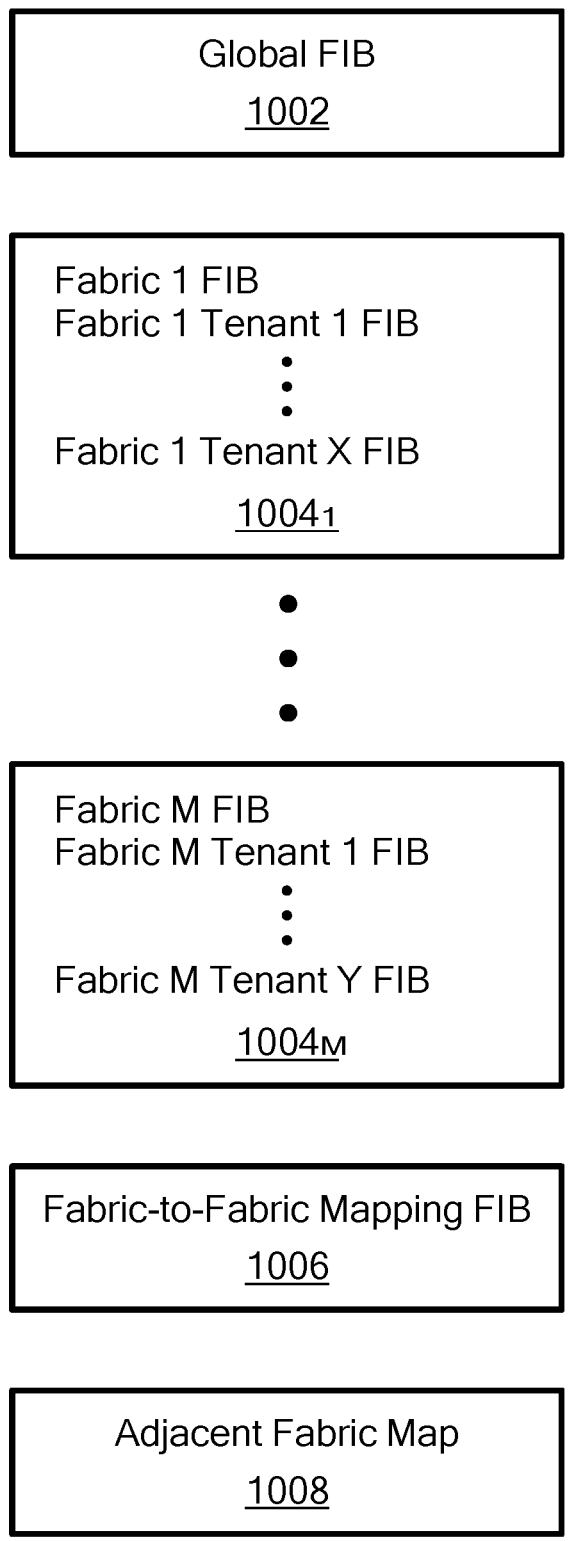
FIG. 10 is a schematic block diagram of the Forwarding Information Bases (FIBs) that are maintained by a RouteIQ router, in accordance with one exemplary embodiment.

FIG. 10 is a schematic block diagram of the FIBs that are maintained by the REX processor 904 in the storage 906. Among other things, the REX processor 904 maintains a Global FIB 1002, a FIB for each Fabric with each such FIB containing a FIB or FIB entries for each Tenant in the Fabric (e.g., Fabric 1 FIB $1001_1$ containing FIB entries for Fabric 1 Tenants 1 to X, through Fabric M FIB $1004_M$ containing FIB entries for Fabric M Tenants 1 to Y), a Fabric-to-Fabric mapping FIB 1006, and an Adjacent Fabric Map 1008.

Figure 11:
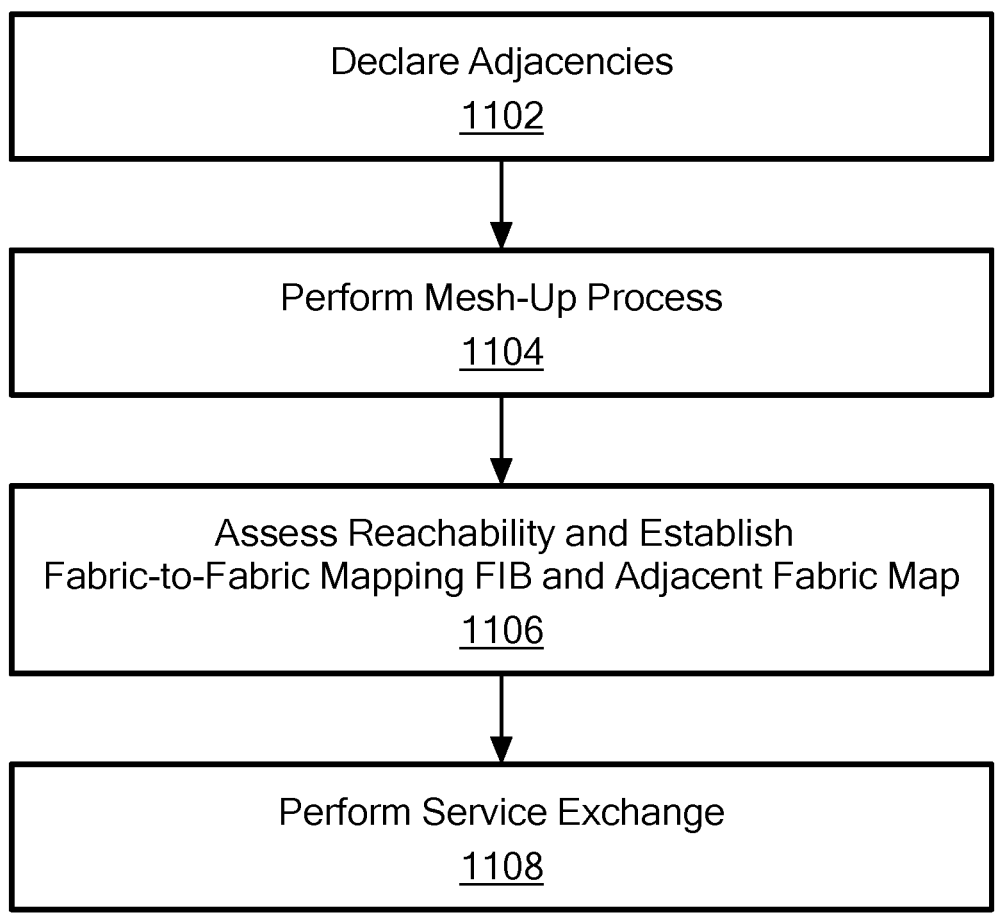
FIG. 11 is a logic flow diagram for routing between Fabrics within a single Authority, in accordance with one exemplary embodiment.

FIG. 11 is a logic flow diagram for routing between Fabrics within a single Authority, in accordance with one exemplary embodiment. In block 1102, the REX processor declares adjacencies. In block 1104, the REX processor then performs the mesh-up process. In block 1106, the REX processor assesses reachability and establishes the Fabric-to-Fabric mapping FIB and the Adjacent Fabric map. In block 1108, the REX processor performs the Service exchange process. It should be noted that the Service exchange process in block 1108 need not follow the assessment of reachability and establishment of the Fabric-to-Fabric mapping FIB and the Adjacent Fabric map in block 1106. Instead, for example, the Service exchange process in block 1108 could be done in parallel with 1102, e.g., if two Fabrics are capable of declaring adjacencies, they can perform the Service exchange at that time. However, the service traffic cannot begin until after block 1106 is completed.

Figure 12:
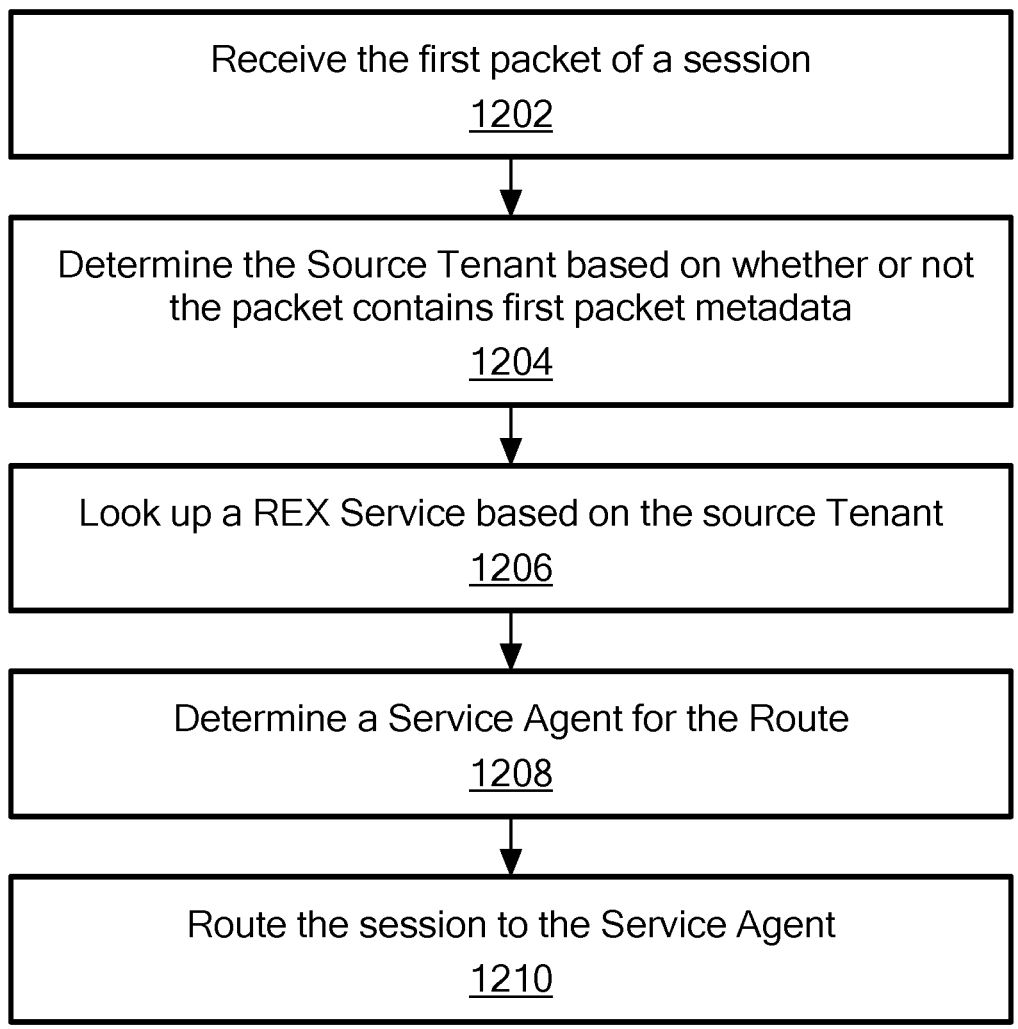
FIG. 12 is a logic flow diagram for processing a received packet, in accordance with one exemplary embodiment.

FIG. 12 is a logic flow diagram for processing a received packet, in accordance with one exemplary embodiment. In block 1202, the REX processor receives the first packet of a session. As discussed above, the packet may or may not contain metadata from a prior RouteIQ router. In block 1204, the REX processor determines the source Tenant for the session based on whether or not the packet contains first packet metadata. In block 1206, the REX processor then finds the appropriate FIB for the Tenant and looks up a REX Service based on the source Tenant. In block 1208, the REX processor determines a Service Agent for the Route, which may be in the same Fabric or a different Fabric than the source Tenant. In block 1210, the REX processor routes the session to the Service Agent.

Figure 13:
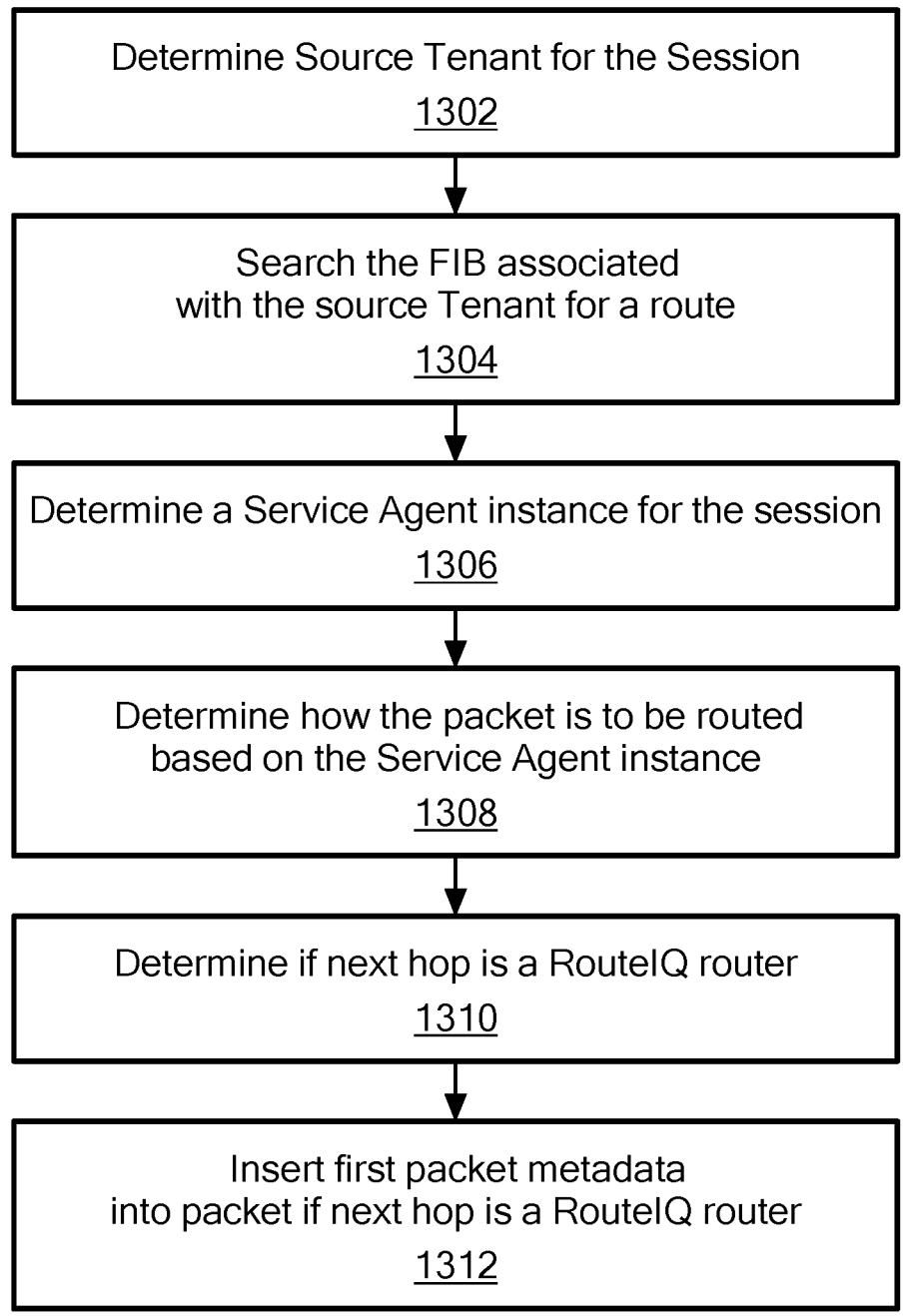
FIG. 13 is a logic flow diagram for inserting first packet metadata into the first packet of a session, in accordance with one exemplary embodiment.

FIG. 13 is a logic flow diagram for inserting first packet metadata into the first packet of a session, in accordance with one exemplary embodiment. In block 1302, the REX processor determines the source Tenant for the session. Specifically, the Tenant is initially set to be the Tenant associated with the ingress interface if one is assigned (otherwise the packet is considered to be associated with Tenant Zero). If the packet's source address matches a Service address or a Service Agent address, then the Tenant is changed to be the Tenant associated with that Service or Service Agent. In block 1304, the REX processor searches the FIB associated with the source Tenant for a route. In block 1306, the REX processor determines a Service Agent instance for the session. In block 1308, the REX processor determines how the packet is to be routed based on the Service Agent instance. In block 1310, the REX processor determines if the next hop is a RouteIQ router. In block 1312, the REX processor inserts first packet metadata into packet if the next hop is a RouteIQ router.

Miscellaneous

It should be noted that headings are used above for convenience and are not to be construed as limiting the present invention in any way.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the REX processor) are necessarily non-conventional because, absent special programming or configuration, the conventional components do not inherently perform the described non-conventional functions.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method of routing packets by a local route exchange processor in a local router, the method comprising:

maintaining, by the local route exchange processor, in a computer storage of the local router, at least one forwarding information base that associates a plurality of named fabrics with at least one uniquely named authority, each fabric having at least one named tenant, each tenant having at least one named service, wherein the local route exchange processor is associated with a distinct local fabric from among the plurality of named fabrics;

exchanging fabric adjacency information by the local route exchange processor with at least one remote route exchange processor, each remote route exchange processor operating in a separate remote router and associated with a distinct remote fabric from among the plurality of named fabrics;

performing, by the local route exchange processor, a mesh-up process to establish at least one communication path between the local fabric and each of the remote fabrics, the mesh-up process including storage of a fabric-to-fabric map that identifies at least one communication path for each remote fabric and an adjacent fabric map that identifies, by name, at least one next hop fabric for each remote fabric;

receiving a first packet to establish a communication session between a source service in a source tenant and a destination service in a destination tenant in a destination fabric;

determining the source tenant for the communication session;

identifying, using the at least one forwarding information base, a service agent for the communication session based on the name of the source tenant and the name of the destination service;

selecting a communication path for the communication session including selecting a next hop fabric for the destination fabric based on the adjacent fabric map and selecting a communication path to the next hop fabric based on the fabric-to-fabric map; and forwarding the first packet via the selected communication path.

2. A method according to claim 1, wherein all fabrics within a single authority are automatically considered to be adjacent.

3. A method according to claim 1, wherein the at least one forwarding information base includes a separate forwarding information base for each source tenant.

4. A method according to claim 1, wherein the first packet includes first packet metadata including the name of the source tenant, and wherein determining the source tenant for the communication session comprises determining the source tenant based on the name of the source tenant in the first packet metadata.

5. A method according to claim 1, wherein determining the source tenant for the communication session comprises determining the source tenant based on a source address in the packet.

6. A method according to claim 1, wherein identifying the service agent comprises selecting one service agent instance from among a plurality of candidate service agent instances.

7. A method according to claim 1, wherein forwarding the first packet comprises:
determining whether a next hop device is a remote router having a remote route exchange processor; and
inserting first packet metadata into the packet when the next hop device is a remote router having a remote route exchange processor.

8. A router comprising:
a computer storage; and
a local route exchange processor configured to implement a method of routing packets comprising:
maintaining, by the local route exchange processor, in the computer storage, at least one forwarding information base that associates a plurality of named fabrics with at least one uniquely named authority, each fabric having at least one named tenant, each tenant having at least one named service, wherein the local route exchange processor is associated with a distinct local fabric from among the plurality of named fabrics;
exchanging fabric adjacency information by the local route exchange processor with at least one remote route exchange processor, each remote route exchange processor operating in a separate remote router and associated with a distinct remote fabric from among the plurality of named fabrics;
performing, by the local route exchange processor, a mesh-up process to establish at least one communication path between the local fabric and each of the remote fabrics, the mesh-up process including storage of a fabric-to-fabric map that identifies at least one communication path for each remote fabric and an adjacent fabric map that identifies, by name, at least one next hop fabric for each remote fabric;

receiving a first packet to establish a communication session between a source service in a source tenant and a destination service in a destination tenant in a destination fabric;

determining the source tenant for the communication session;

identifying, using the at least one forwarding information base, a service agent for the communication session based on the name of the source tenant and the name of the destination service;

selecting a communication path for the communication session including selecting a next hop fabric for the destination fabric based on the adjacent fabric map and selecting a communication path to the next hop fabric based on the fabric-to-fabric map; and forwarding the first packet via the selected communication path.

9. A router according to claim 8, wherein all fabrics within a single authority are automatically considered to be adjacent.

10. A router according to claim 8, wherein the at least one forwarding information base includes a separate forwarding information base for each source tenant.

11. A router according to claim 8, wherein the first packet includes first packet metadata including the name of the source tenant, and wherein determining the source tenant for the communication session comprises determining the source tenant based on the name of the source tenant in the first packet metadata.

12. A router according to claim 8, wherein determining the source tenant for the communication session comprises determining the source tenant based on a source address in the packet.

13. A router according to claim 8, wherein identifying the service agent comprises selecting one service agent instance from among a plurality of candidate service agent instances.

14. A router according to claim 8, wherein forwarding the first packet comprises:
determining whether a next hop device is a remote router having a remote route exchange processor; and
inserting first packet metadata into the packet when the next hop device is a remote router having a remote route exchange processor.

15. A computer program product comprising a tangible, non-transitory computer readable medium having embodied therein a computer program that, when run on at least one computer processor, implements a local route exchange processor for a local router, the local route exchange processor implementing a method of routing packets comprising:
maintaining, by the local route exchange processor, in a computer storage of the local router, at least one forwarding information base that associates a plurality of named fabrics with at least one uniquely named authority, each fabric having at least one named tenant, each tenant having at least one named service, wherein the local route exchange processor is associated with a distinct local fabric from among the plurality of named fabrics;
exchanging fabric adjacency information by the local route exchange processor with at least one remote route exchange processor, each remote route exchange processor operating in a separate remote router and associated with a distinct remote fabric from among the plurality of named fabrics;

performing, by the local route exchange processor, a mesh-up process to establish at least one communication path between the local fabric and each of the remote fabrics, the mesh-up process including storage of a fabric-to-fabric map that identifies at least one communication path for each remote fabric and an adjacent fabric map that identifies, by name, at least one next hop fabric for each remote fabric;

receiving a first packet to establish a communication session between a source service in a source tenant and a destination service in a destination tenant in a destination fabric;

determining the source tenant for the communication session;

identifying, using the at least one forwarding information base, a service agent for the communication session based on the name of the source tenant and the name of the destination service;

selecting a communication path for the communication session including selecting a next hop fabric for the destination fabric based on the adjacent fabric map and selecting a communication path to the next hop fabric based on the fabric-to-fabric map; and forwarding the first packet via the selected communication path.

16. A computer program product according to claim 15, wherein all fabrics within a single authority are automatically considered to be adjacent.

17. A computer program product according to claim 15, wherein the at least one forwarding information base includes a separate forwarding information base for each source tenant.

18. A computer program product according to claim 15, wherein the first packet includes first packet metadata including the name of the source tenant, and wherein determining the source tenant for the communication session comprises determining the source tenant based on the name of the source tenant in the first packet metadata.

19. A computer program product according to claim 15, wherein determining the source tenant for the communication session comprises determining the source tenant based on a source address in the packet.

20. A computer program product according to claim 15, wherein identifying the service agent comprises selecting one service agent instance from among a plurality of candidate service agent instances.

21. A computer program product according to claim 15, wherein forwarding the first packet comprises:
   determining whether a next hop device is a remote router having a remote route exchange processor; and
   inserting first packet metadata into the packet when the next hop device is a remote router having a remote route exchange processor.

* * * * *